(12) United States Patent
Matsuoka et al.

(10) Patent No.: US 7,974,077 B2
(45) Date of Patent: Jul. 5, 2011

(54) SOLID ELECTROLYTIC CAPACITOR

(75) Inventors: Keiko Matsuoka, Izumisano (JP); Shoji Umeda, Daito (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 225 days.

(21) Appl. No.: 12/329,843

(22) Filed: Dec. 8, 2008

(65) Prior Publication Data

US 2009/0147448 A1 Jun. 11, 2009

(30) Foreign Application Priority Data

Dec. 7, 2007 (JP) ................................. 2007-317414

(51) Int. Cl.
*H01G 4/228* (2006.01)
*H01G 5/38* (2006.01)
*H01G 9/10* (2006.01)

(52) U.S. Cl. .................... 361/540; 361/541; 361/538

(58) Field of Classification Search .................. 361/535, 361/538–539, 540–541, 533, 531
See application file for complete search history.

(56) References Cited

U.S. PATENT DOCUMENTS

| | | | |
|---|---|---|---|
| 4,037,142 A | 7/1977 | Poole | |
| 4,539,623 A | 9/1985 | Irikura et al. | |
| 6,751,086 B2 | 6/2004 | Matsumoto | |
| 6,808,541 B2 | 10/2004 | Maeda | |
| 6,816,358 B2 | 11/2004 | Kida et al. | |
| 7,468,882 B2 * | 12/2008 | Marek et al. | ........... 361/540 |
| 7,729,102 B2 | 6/2010 | Kuriyama | |
| 2006/0056136 A1 * | 3/2006 | Fujii et al. | ........... 361/540 |
| 2007/0081301 A1 | 4/2007 | Tanaka | |
| 2009/0147449 A1 | 6/2009 | Matsuoka et al. | |

FOREIGN PATENT DOCUMENTS

| | | | |
|---|---|---|---|
| GB | 2 262 840 A | | 6/1993 |
| JP | 01259521 A | * | 10/1989 |
| JP | 08195330 A | * | 7/1996 |
| JP | 2002-367862 A | | 12/2002 |
| JP | 2005353709 A | * | 12/2005 |
| JP | 2006-108172 A | | 4/2006 |
| JP | 2006-319113 A | | 11/2006 |
| KR | 1996-0010110 B1 | | 7/1996 |
| KR | 20-0406127 Y1 | | 1/2006 |

(Continued)

OTHER PUBLICATIONS

Korean Office Action dated Nov. 10, 2010, issued in corresponding Korean Patent Application No. 10-2008-0110383.

(Continued)

*Primary Examiner* — Eric Thomas
(74) *Attorney, Agent, or Firm* — Westerman, Hattori, Daniels & Adrian, LLP

(57) ABSTRACT

A solid electrolytic capacitor includes a capacitor element, an anode lead frame, a cathode lead frame, and a mold resin portion. The anode lead frame includes an anode terminal portion and a rising portion. The rising portion is formed integral with the anode terminal portion, and extends from the anode terminal portion through the mold resin portion toward the anode portion, and is connected to the anode portion. At the rising portion, a catching recess and a holding portion are formed and, in addition, a first slit is formed downward from the catching recess. Thus, a solid electrolytic capacitor allowing highly accurate and reliable attachment of the capacitor element to the lead frame without using any additional member is provided.

13 Claims, 25 Drawing Sheets

FOREIGN PATENT DOCUMENTS

KR  10-2006-0113347 A  11/2006

OTHER PUBLICATIONS

Korean Office Action dated Nov. 10, 2010 issued in corresponding Korean Patent Application No. 10-2008-0110385.

US Office Action dated Nov. 23, 2010 issued in corresponding U.S. Appl. No. 12/330,027.
Notice of Allowance dated Mar. 21, 2011, issued in related U.S. Appl. No. 12/330,027.

* cited by examiner

SOLID ELECTROLYTIC CAPACITOR

BACKGROUND OF THE INVENTION

1. Field of the Invention

The present invention relates to a solid electrolytic capacitor and, more specifically, to a solid electrolytic capacitor having a capacitor element mounted on a prescribed lead frame and sealed with a mold resin portion.

2. Description of the Background Art

A solid electrolytic capacitor is one of electronic components that can be surface-mounted on a printed circuit board or the like. As shown in FIG. 44 or 45, a solid electrolytic capacitor 101 of this type includes a capacitor element 102, an anode lead frame 110, a cathode lead frame 120 and a mold resin portion 140 sealing these components. Capacitor element 102 has a substantially columnar (rectangular parallelepiped) anode body 103, an anode portion 104 protruded from the body, and a cathode portion 105 formed on an outer surface surrounding anode body 103. Anode lead frame 110 is electrically connected to anode portion 104 with a pillow member 180 interposed, and cathode lead frame 120 is electrically connected directly to cathode portion 105. Other than the pillow member, a member of different shape, formed to have a prescribed shape, is also used in some capacitors.

Solid electrolytic capacitor 101 of this type is manufactured in the following manner. First, a lead frame is punched out to have a prescribed shape, whereby a portion to be the anode lead frame and a portion to be the cathode lead frame are formed. Next, a conductive pillow member is welded on the portion to be the anode lead frame. Next, the anode portion of capacitor element is placed at a prescribed position with respect to the welded pillow member, and the cathode portion is placed at a prescribed position on the portion to be the cathode lead frame, and the capacitor element is attached to the lead frame.

Next, the portion to be the anode lead frame, the portion to be the cathode lead frame and the capacitor element are surrounded by a prescribed metal mold, and mold resin is poured to the metal mold, so that the capacitor element and the like are sealed. Thereafter, the mold resin portion sealing the capacitor element and the like is cut out at a prescribed position from the lead frame, and the solid electrolytic capacitor is completed. In the solid electrolytic capacitor, a part of anode lead frame and a part of cathode lead frame protrude as terminals, from the mold resin portion.

A method of welding the pillow member at the anode portion of capacitor element has also been proposed, rather than welding the pillow member at the portion to be the anode lead frame. The solid electrolytic capacitors of this type are disclosed, for example, in Japanese Patent Laying-Open Nos. 2006-319113 and 2002-367862.

The conventional solid electrolytic capacitor 101, however, has the following problems. As described above, in order to electrically connect anode portion 104 and anode lead frame 110 of capacitor element 102, pillow member 108 is positioned between anode portion 104 and anode lead frame 110. Therefore, when attaching capacitor element 102 to the lead frame, an additional member is required, and a process step of welding the pillow member 108 as such to the lead frame is additionally required, hindering reduction of manufacturing cost.

Further, when pillow member 180 is welded on anode portion 104 of capacitor element 102, location or strength of welding may vary, making it difficult to attach capacitor element 102 to the lead frame with high accuracy. This leads to lower production yield of solid electrolytic capacitor 101.

SUMMARY OF THE INVENTION

The present invention was made to solve the above-described problem, and its object is to provide a solid electrolytic capacitor allowing highly accurate and reliable attachment of the capacitor element on the lead frame without applying any additional member.

The present invention provides a solid electrolytic capacitor, including a capacitor element, a mold resin portion, an anode lead frame and a cathode lead frame. The capacitor element has an anode portion and a cathode portion. The mold resin portion seals the capacitor element. The anode lead frame is connected to the anode portion from below the anode portion of the capacitor element, inside the mold resin portion. The cathode lead frame is connected to the cathode portion. The anode lead frame has a catching recess for receiving the anode portion, a holding portion and a slit. The catching recess is opened upward. The holding portion is formed, on the opened side of the catching recess, to prevent passage of the anode portion, allows passage of the anode portion when the anode portion is pressed from above, and holds the anode portion once the anode portion is received in the catching recess. The slit extends downward from the catching recess.

In this structure, the anode portion of the capacitor element is connected to the anode lead frame from below, inside the mold resin portion. Therefore, as compared with the solid electrolytic capacitor having the pillow member interposed between the lead frame and the anode portion, the additional pillow member becomes unnecessary, and the process step of welding the pillow member to the lead frame becomes unnecessary, whereby manufacturing cost can be reduced. Further, when the anode portion is received in the catching recess, the holding portion is easily widened because of the slit, allowing smooth passage of the anode portion. After the anode portion is received, the holding portion returns to the original state and securely holds the anode portion. Thus, the capacitor element can be attached to the lead frame with high accuracy.

In connection with the specific structure of the anode lead frame, preferably, the anode lead frame includes an anode terminal portion exposed along a bottom surface of the mold resin portion, and a rising portion formed integral with the anode terminal portion, extending from an end of the anode terminal portion closer to the cathode portion of the capacitor element through the mold resin portion toward the anode portion of the capacitor element, and is connected to the anode portion. The catching recess, the holding portion and the slit are preferably formed in the rising portion.

Further, preferably, the rising portion includes one and the other side end portions positioned in a direction orthogonal to the direction of the rising portion extending from the anode terminal portion, and each of the side end portions is bent in a direction away from the cathode portion of the capacitor element.

Therefore, it becomes possible to reliably prevent deformation or falling of the rising portion when the anode portion is attached to the lead frame by pressing the anode portion from above. Further, as the side end portion is bent, closer contact to the mold resin portion can be attained.

Further, preferably, the anode lead frame is arranged such that an upper surface of the anode terminal portion is in direct contact with a bottom surface of the mold resin portion.

Therefore, it becomes possible to place an end portion of metal mold cavity close to a prescribed position of the anode lead frame and, as a result, capacity of the cavity can be increased.

Preferably, the cathode lead frame includes a cathode terminal portion exposed along a bottom surface of the mold resin portion, and a pair of side surface portions extending from the cathode terminal portion through a step portion and inside the mold resin portion, erected opposite to each other with the cathode portion of the capacitor element placed therebetween and connected to the cathode portion.

Accordingly, when the capacitor element is attached to the anode lead frame and the cathode lead frame, what is necessary is simply to place the capacitor element at a region between one side surface portion and the other side surface portion, and therefore positioning of capacitor element with respect to each lead frame becomes easier.

Preferably, the side surface portion includes a first side surface portion, and a second side surface portion positioned on an opposite side to the anode portion with respect to the first side surface portion.

By this structure, it is possible to reliably have the side surface portion in contact with the cathode portion, well fit to the outer shape of the capacitor element.

Further, preferably, the solid electrolytic capacitor preferably includes an extending portion extending from the side surface portion to a side opposite to the anode portion.

This increases contact area between the cathode lead frame and the cathode portion, and the equivalent series resistance can be reduced.

Further, preferably, the cathode lead frame is arranged such that an upper surface of the cathode terminal portion is in direct contact with the bottom surface of the mold resin portion.

Therefore, it becomes possible to place an end portion of metal mold cavity close to a prescribed position of the cathode lead frame and, as a result, capacity of the cavity can be increased Further, the number of capacitor elements is not limited to one, and a plurality of capacitor elements may be provided. In that case, preferably, the anode portions of the plurality of capacitor elements are arranged in the same orientation and connected to the anode lead frame.

Further, when a plurality of capacitor elements are mounted, in order to reliably prevent deformation of the anode lead frame, preferably, a through hole is formed at a region immediately below a portion between one and the other capacitor elements adjacent to each other, among the plurality of capacitor elements. Preferably, at a portion of the anode lead frame immediately below a portion between one and the other capacitor elements adjacent to each other among the plurality of capacitor elements, another slit is formed extending downward from an upper end of the anode lead frame.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Solid Electrolytic Capacitor

Figure 1:
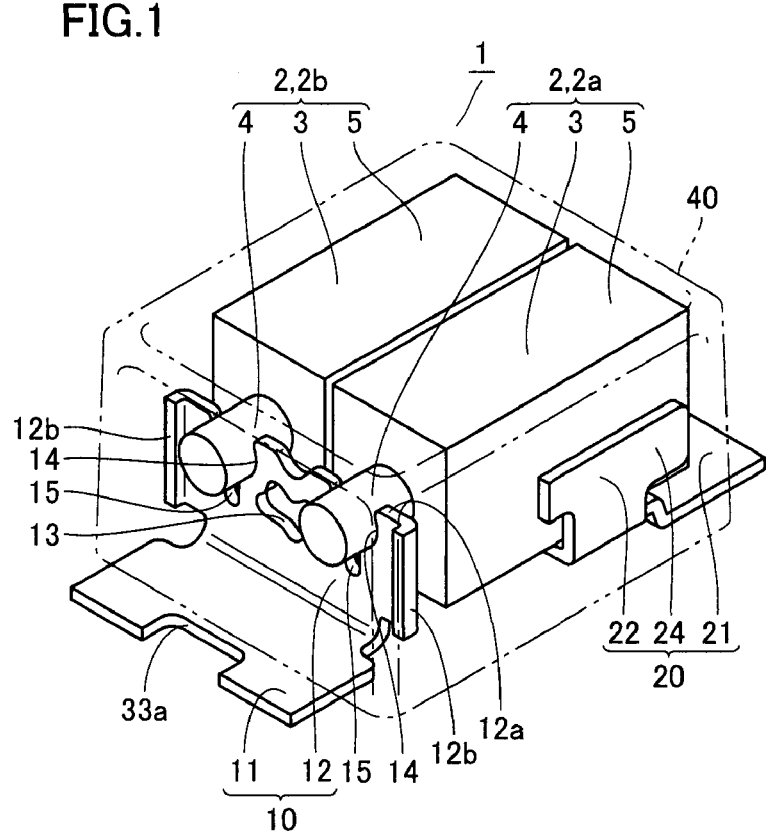
FIG. 1 is a perspective view showing a solid electrolytic capacitor in accordance with an embodiment of the present invention.

The solid electrolytic capacitor in accordance with an embodiment of the present invention will be described. As shown in FIGS. 1 to 5, solid electrolytic capacitor 1 includes two capacitor elements 2, 2a, 2b, an anode lead frame 10, a cathode lead frame 20 and a mold resin portion 40 sealing these. Capacitor element 2 has a substantially columnar (rectangular parallelepiped) anode body 3, an anode portion 4 protruded from the body, and a cathode portion 5 formed on an outer surface surrounding anode body 3. The two capacitor elements 2a and 2b are arranged with anode portions 4 facing the same direction.

Anode lead frame 10 has an anode terminal portion 11 and a rising portion 12. Anode terminal portion 11 is exposed along a bottom surface 40a of mold resin portion 40. An upper surface 11a of anode terminal portion 11 is directly in contact with a bottom surface 40a of mold resin portion 40, and upper surface 11a and bottom surface 40a are positioned substantially on one same plane (see FIGS. 2, 3 and 5). Rising portion 12 is formed integrally with anode terminal portion 11. Rising portion 12 extends, from an end of anode terminal portion 11 closer to cathode portion 5 of capacitor element 2 through mold resin portion 40 to anode portion 4, and connected to anode portion 4 from below the anode portions 4 of two capacitors 2a and 2b, respectively.

At rising portion 12, a catching recess 14 opened upward to receive anode portion 4 is formed. At the open side of catching recess 14, holding portions 14a, 14a are formed spaced apart by a prescribed distance from each other, in a manner to prevent passage of anode portion 4. When anode portion is pressed from above into catching recess 14, the space between holding portions 14a and 14a is widened, allowing passage of anode portion 4. After anode portion 4 passes between holding portions 14a and 14a and received in catching recess 14, anode portion 4 comes to be held by holding portions 14a and 14a.

A first slit 15 is formed downward from catching recess 14. Further, between one and the other catching recesses 14, a second slit 16 is formed extending downward from an upper end portion 12a of rising portion 12, and below the second slit 16, a through hole 13 is formed (see FIG. 2). Further, at rising portion 12, one and the other side end portions 12b in a direction orthogonal to the direction of rising portion 12 extending from anode terminal portion 11 are bent in a direction away from cathode portion 5 of capacitor element 2 (see FIGS. 1 and 4).

Figure 2:
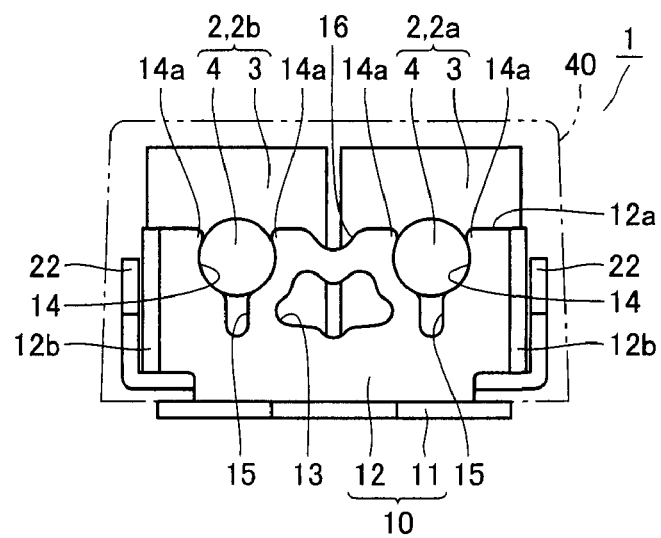
FIG. 2 is a front view of the solid electrolytic capacitor shown in FIG. 1, in accordance with the embodiment.
Figure 3:
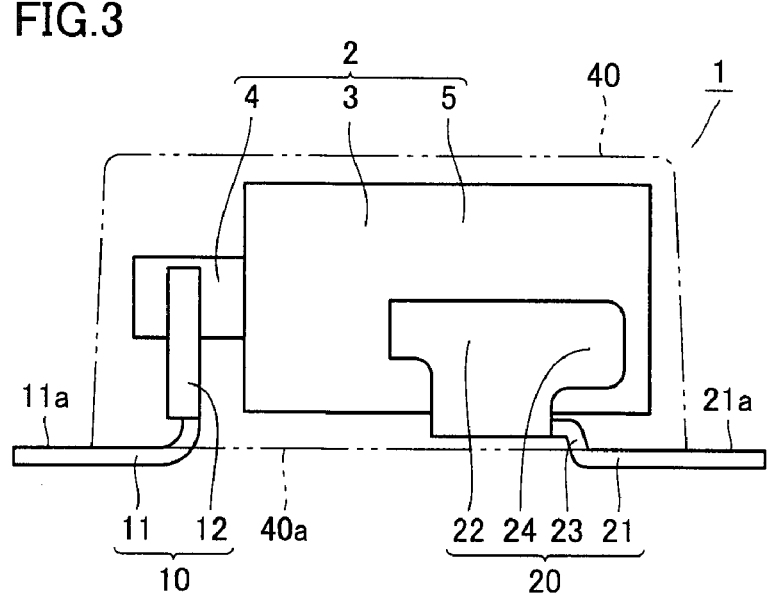
FIG. 3 is a side view of the solid electrolytic capacitor shown in FIG. 1, in accordance with the embodiment.
Figure 4:
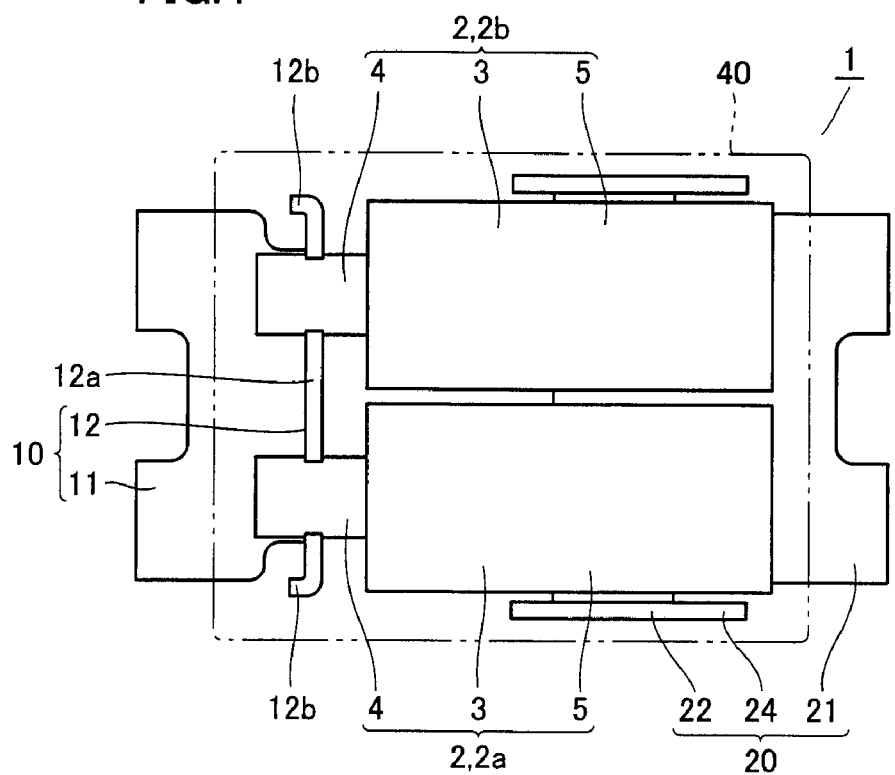
FIG. 4 is a top view of the solid electrolytic capacitor shown in FIG. 1, in accordance with the embodiment.
Figure 5:
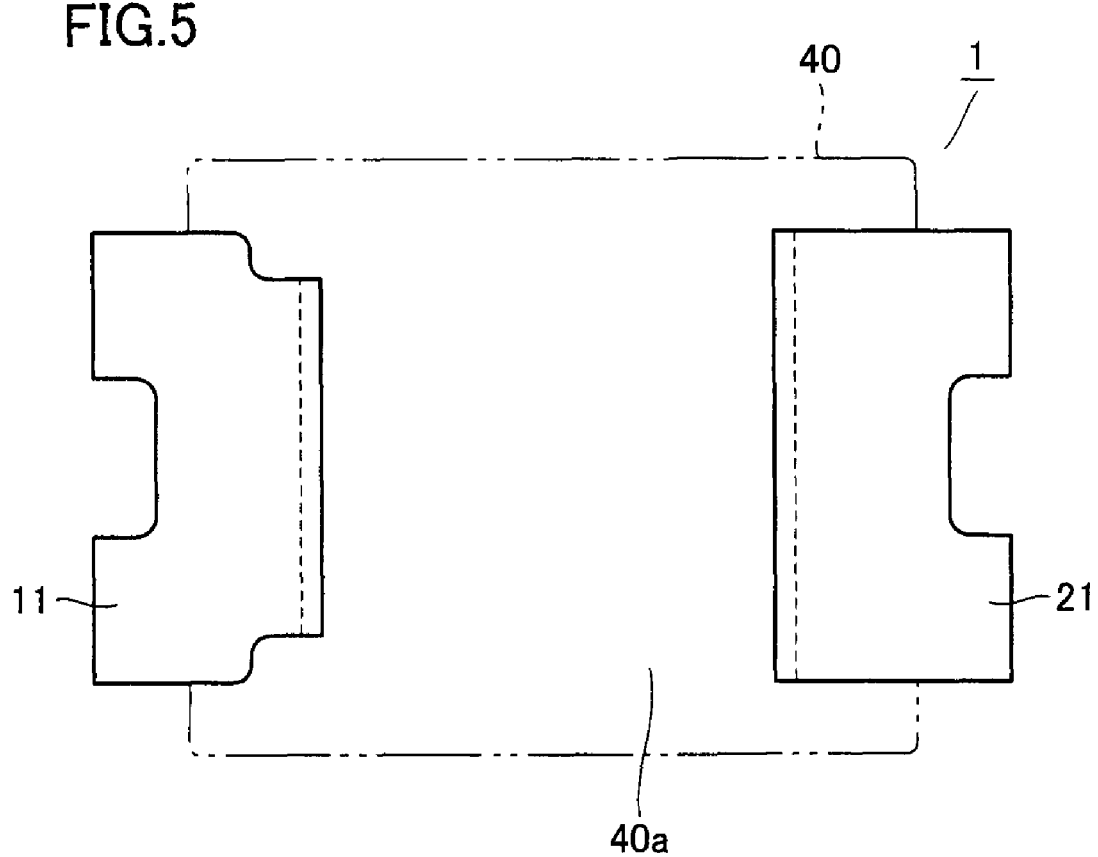
FIG. 5 is a bottom view of the solid electrolytic capacitor shown in FIG. 1, in accordance with the embodiment.

Cathode lead frame 20 includes a cathode terminal portion 21, a pair of side surface portions 22, and a step portion 23 (see FIG. 3). Cathode terminal portion 21 is exposed along the bottom surface of mold resin portion 40. An upper surface 21a of cathode terminal portion 21 is directly in contact with bottom surface 40a of mold resin portion 40, and upper surface 21a and bottom surface 40a are positioned substantially on one same plane (see FIGS. 2, 3 and 5). The pair of side surface portions 22 extend from cathode terminal portion 21 through step portion 23 in mold resin portion 40, and erected opposite to each other with anode body 3 of capacitor element 2 placed therebetween. Side surface portion 22 has an extended portion 24 extending in a direction opposite to the position of anode portion 4.

Lead Frame

Figure 6:
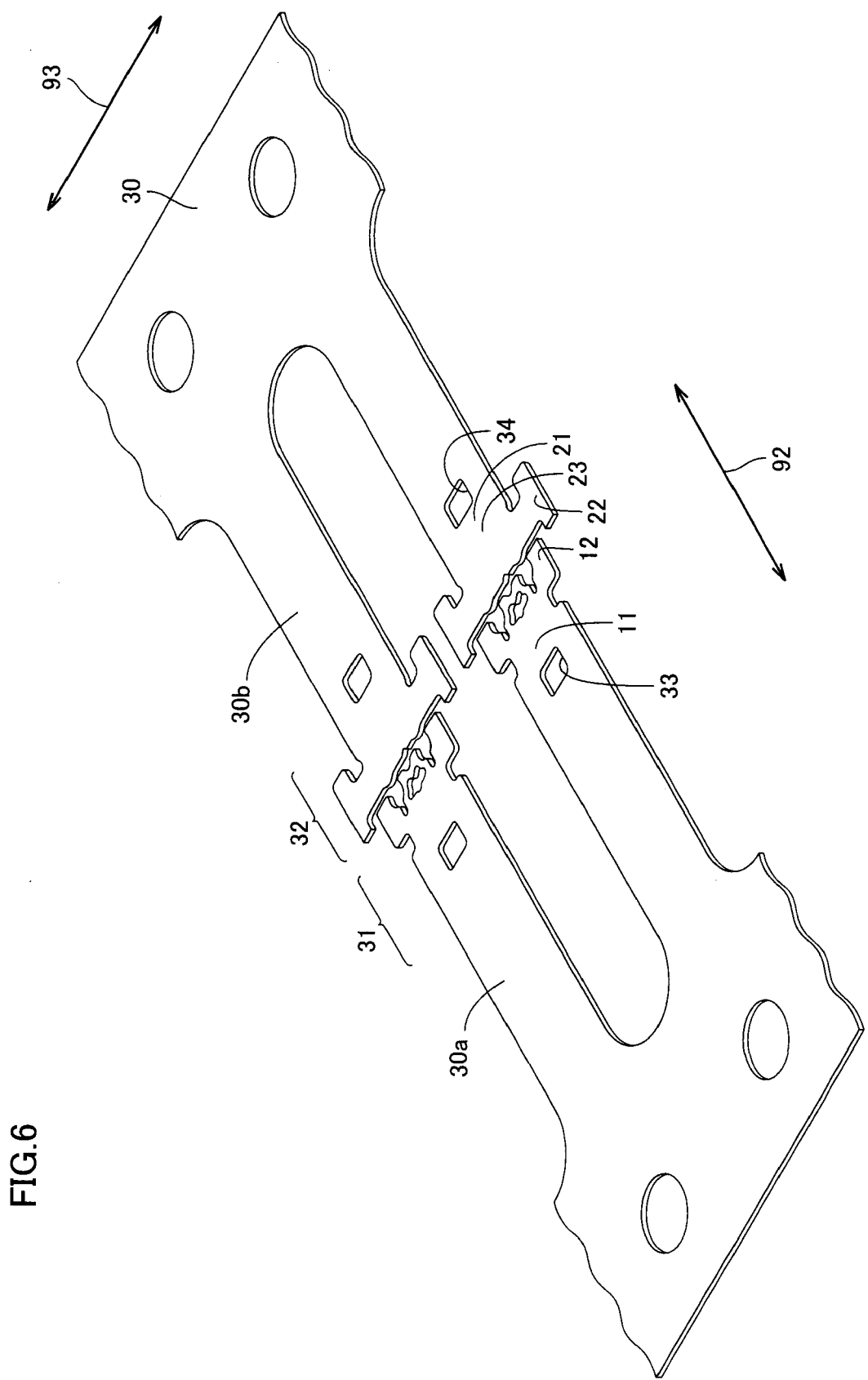
FIG. 6 is a partial perspective view showing a part of the lead frame applied to the solid electrolytic capacitor and showing a step of manufacturing the solid electrolytic capacitor, in accordance with the embodiment.

Next, anode lead frame 10 and cathode lead frame 20 of solid electrolytic capacitor 1 will be described. As shown in FIG. 6, a lead frame 30 is formed by punching out a thin sheet metal extending as a strip (in a direction indicated by an arrow 93) with a prescribed width (in a direction indicated by an arrow 92) to a prescribed shape. It is noted that the direction of arrow 92 is the shorter side direction, and the direction of arrow 93 is the longitudinal direction. A portion 31 to be the anode lead frame is formed at a portion 30a that extends from one end in the shorter side direction of lead frame 30 to the central portion in the shorter side direction.

Figure 7:
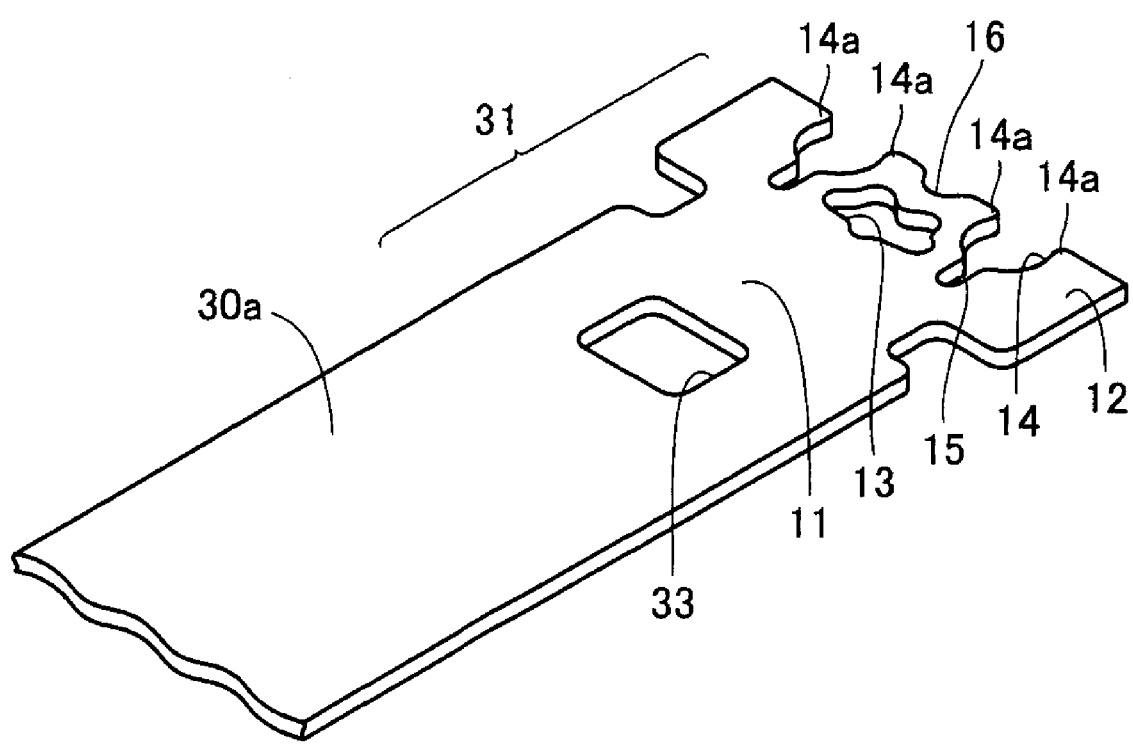
FIG. 7 is a partially enlarged perspective view showing a portion to be the anode lead frame, of the lead frame shown in FIG. 6, in accordance with the embodiment.

As shown in FIG. 7, the portion 30a is punched out in a shape of anode terminal portion 11 and rising portion 12 developed two-dimensionally. At the portion to be the rising portion 12, catching recess 14, holding portions 14a, 14a, first slit 15, second slit 16 and through hole 13 are formed. At a portion connecting anode terminal portion 11 and rising portion 12, in order to ensure bending accuracy when bending rising portion 12 upward, an incurve recess is formed by punching. Further, close to a portion 31 to be the anode lead frame, a fillet hole 33 is formed, which is used for soldering the completed solid electrolytic capacitor to a printed circuit board or the like.

As shown in FIG. 6, a portion to be the cathode lead frame 32 is formed at a portion 30b that extends from the other end in the shorter side direction of lead frame 30 to the central portion in the shorter side direction. The portion 30b is punched out in a shape of cathode terminal portion 21, side surface portions 22 and step portion 23 developed two-dimensionally. Extended portion 24 provided at side surface portion 22 is formed in a direction opposite to the side where the portion 31 to be the anode lead frame is to be formed, in order to avoid contact with the portion 31 to be the anode lead frame. Further, at a portion connecting side surface portion 22 and cathode terminal portion 21, in order to ensure bending accuracy when bending side surface portion 22 upward, an incurve recess is formed by punching. Further, close to a portion 32 to be the cathode lead frame, a fillet hole 34 is formed, which is used for soldering the completed solid electrolytic capacitor to a printed circuit board or the like.

Method of Manufacturing Solid Electrolytic Capacitor

Next, an exemplary method of manufacturing solid electrolytic capacitor will be described. First, as shown in FIG. 6, a lead frame 30 is formed, which is punched out to the shape of the portion 31 to be the anode lead frame and the portion 32 to be the cathode lead frame developed two-dimensionally (press punching process). Next, lead frame 30 is wound around a prescribed reel (not shown) and lead frame 30 is subjected to prescribed plating process (plating process). The plating process is performed prior to the next step of press bending and, therefore, it is possible to perform highly efficient plating with large number of lead frames wound around the reel.

Figure 8:
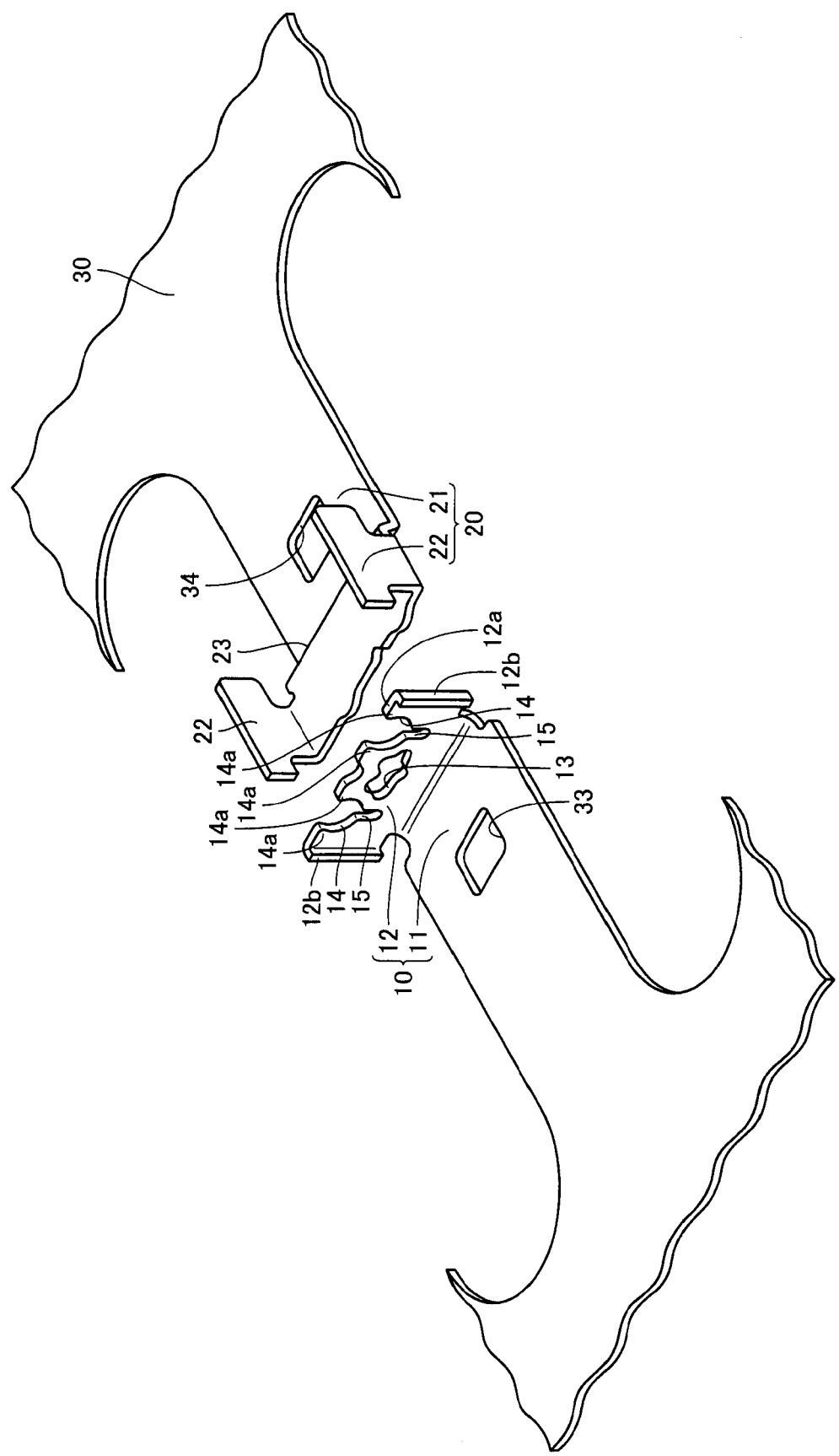
FIG. 8 is a partial perspective view showing a step following the step of FIG. 6, in accordance with the embodiment.

Next, as shown in FIG. 8, lead frame 30 is subjected to press bending (press bending process). At the portion 31 to be the anode lead frame (see FIG. 7), rising portion 12 is bent upward from anode terminal portion 11. Side end portions 12b of rising portion 12 are bent in a direction opposite to the portion 32 to be the cathode lead frame (see FIG. 7). At the portion 32 to be the cathode lead frame, step portion 23 is formed in cathode terminal portion 21, and side surface portions 22 are bent upward. Here, the recess is formed at the portion to be bent and, therefore, rising portion 12 and the like can be bent with high accuracy at a prescribed position by a prescribed angle.

Figure 9:
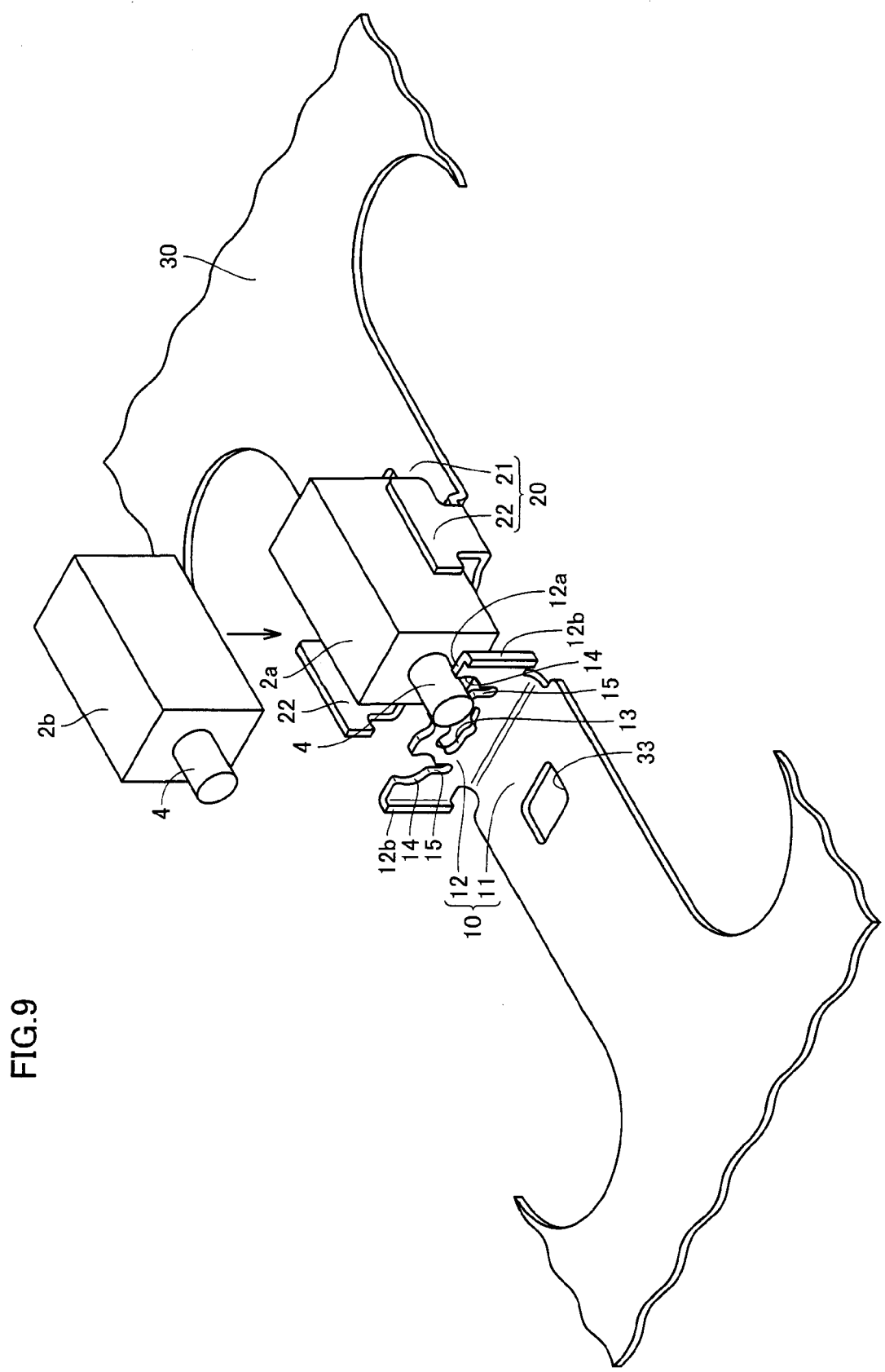
FIG. 9 is a partial perspective view showing a step following the step of FIG. 8, in accordance with the embodiment.
Figure 10:
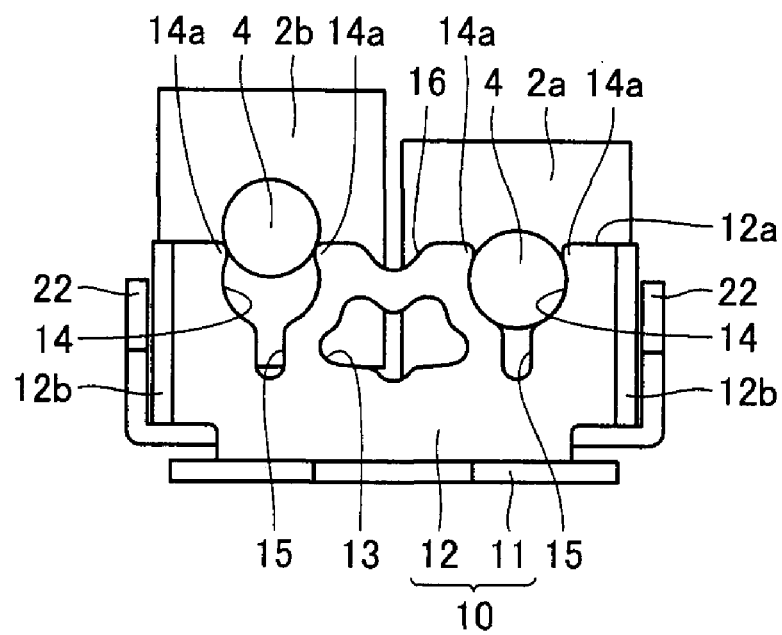
FIG. 10 is a front view showing a step following the step of FIG. 9, in accordance with the embodiment.

Next, capacitor element 2 is mounted on lead frame 30 (mounting process). As shown in FIG. 9, first, one capacitor element 2a of two capacitor elements 2 is mounted on lead frame 30 such that its anode portion 4 is in contact with holding portions 14a of catching recess 14 and its cathode portion 5 is in contact with one of the pair of side surface portions 22. Next, capacitor element 2a (anode portion 4) is pressed from above to the catching recess 14, so that the space between holding portions 14a and 14a (see FIG. 10) is widened, anode portion 4 passes through the space between holding portions 14a and 14a, and eventually, anode portion 4 is received by catching recess 14 as shown in FIG. 10. After anode portion 4 is received in the catching recess, the space between holding portion 14a and 14a returns to the original space that prevents passage of anode portion 4, so that anode portion 4 comes to be held between holding portions 14a and 14a.

Figure 11:
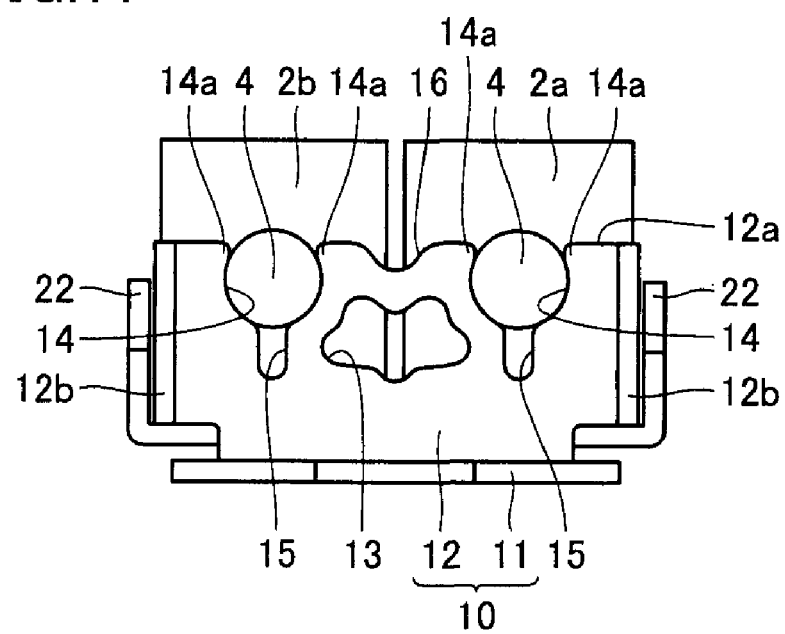
FIG. 11 is a front view showing a step following the step of FIG. 10, in accordance with the embodiment.

Next, the other capacitor element 2b is mounted on lead frame 30 such that its anode portion 4 is in contact with holding portions 14a of catching recess 14 and its cathode portion 5 is in contact with the other one of the pair of side surface portions 22. Then, anode portion 4 is pressed from above to the catching recess 14, so that anode portion passes through the space between holding portions 14a and 14a, and eventually, anode portion 4 is received by catching recess 14 and held by holding portions 14a and 14a, as shown in FIG. 11.

Figure 12:
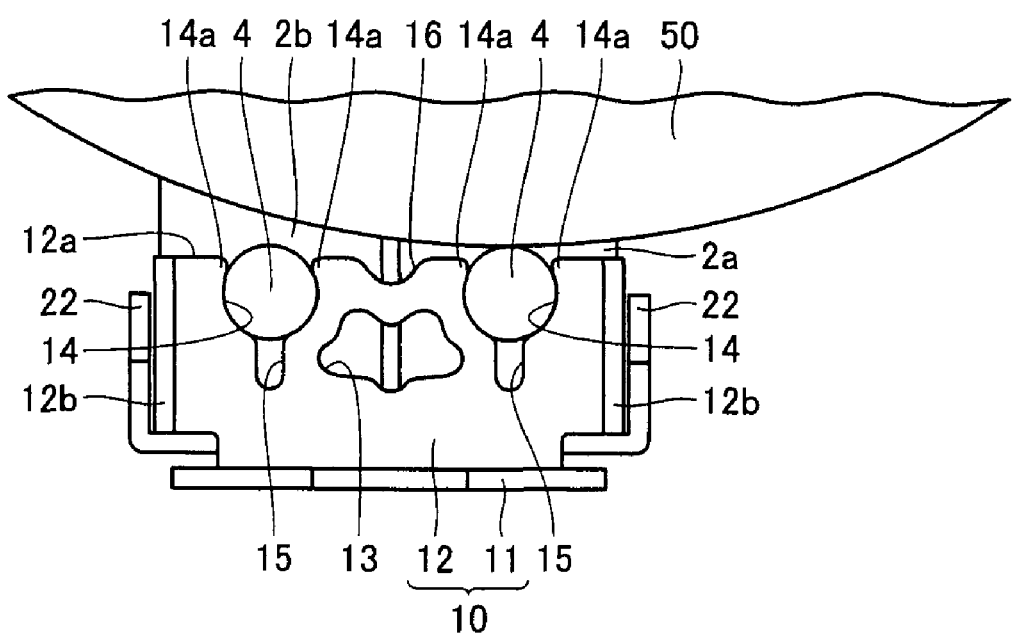
FIG. 12 is a partial front view showing a step following the step of FIG. 11, in accordance with the embodiment.
Figure 13:
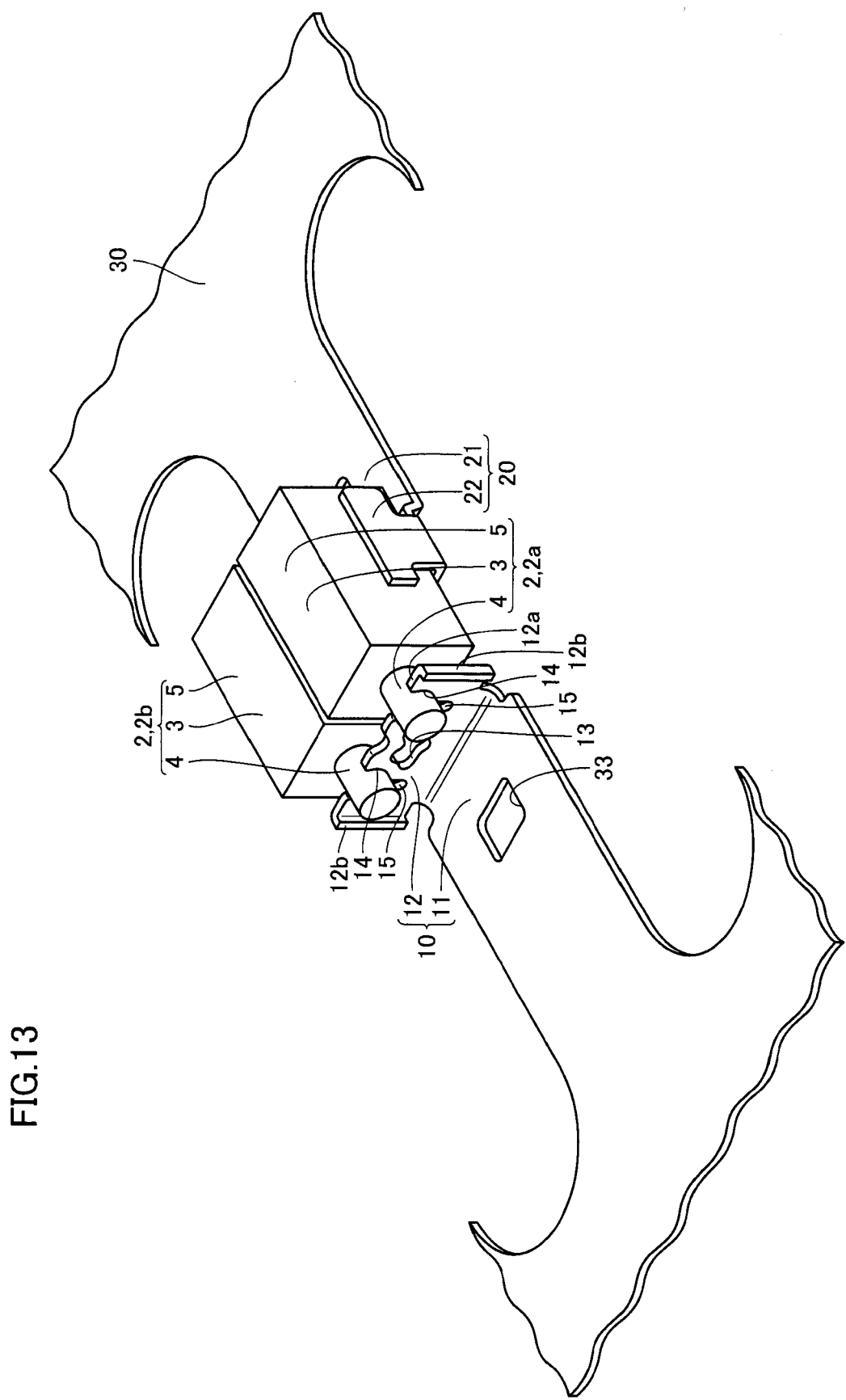
FIG. 13 is a partial perspective view showing a step following the step of FIG. 12, in accordance with the embodiment.

Next, the anode portion is welded to the rising portion (welding step). As shown in FIG. 12, first, a prescribed circular welding electrode 50 is brought into contact with anode portion 4 of one capacitor element 2a, and a prescribed current is caused to flow. By the current flow, heat generates at the portion where anode portion 4 is in contact with catching recess 14, so that part of the catching recess 14 melts and anode portion 4 is welded to rising portion 12. Next, welding electrode 50 is moved, and similar process is performed on anode portion 4 of the other capacitor element 2b, whereby anode portion 4 of capacitor element 2b is welded to the rising portion 12. In this manner, anode portions 4 of two capacitor elements 2a and 2b are welded to rising portion 12 of lead frame 30, as shown in FIG. 13.

Figure 14:
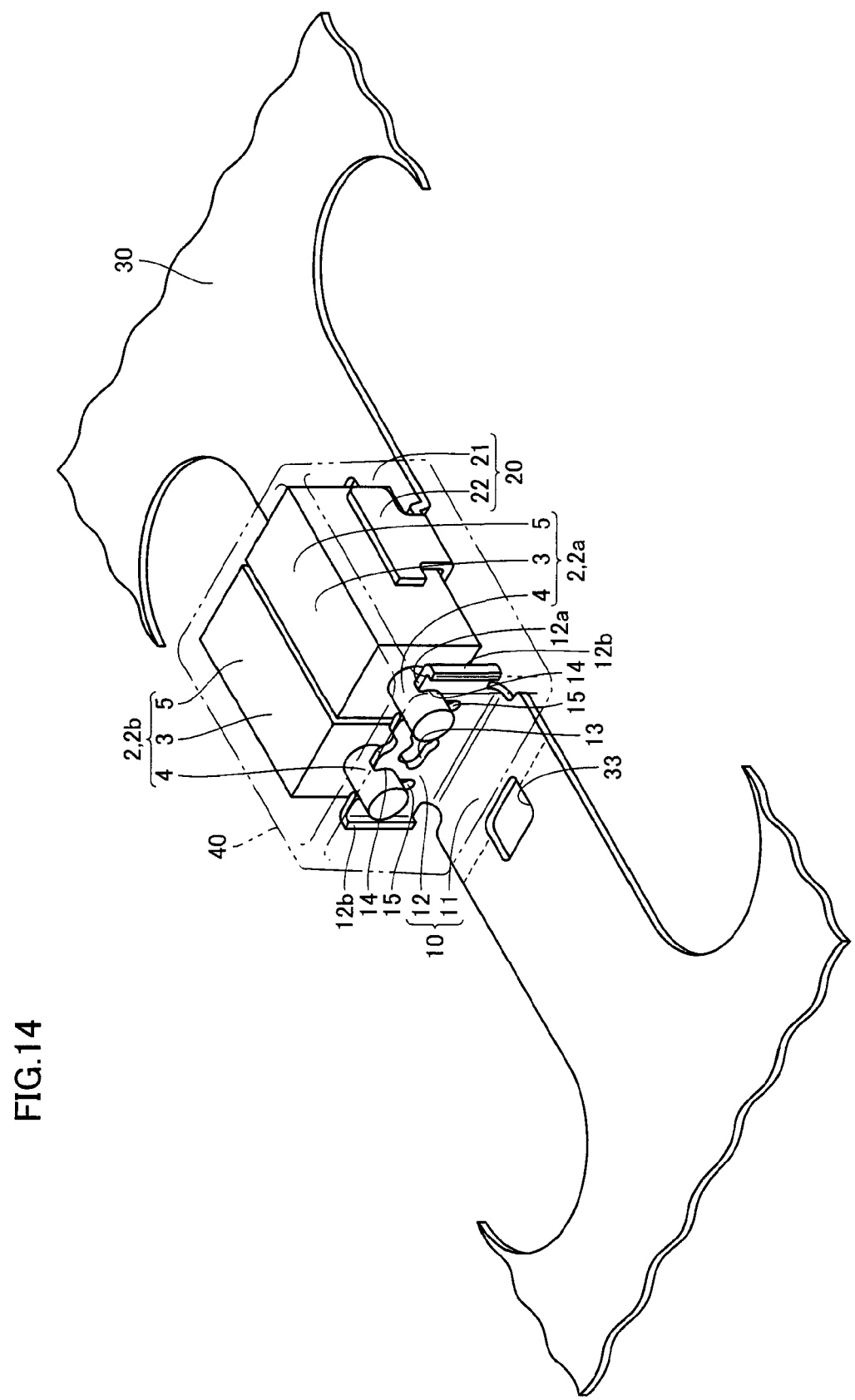
FIG. 14 is a partial perspective view showing a step following the step of FIG. 13, in accordance with the embodiment.

Thereafter, sealing with mold resin takes place (sealing process). Lead frame 30 having capacitor elements 2 held thereon is placed in a prescribed metal mold. Metal mold consists of an upper mold and a lower mold, and at least one of the upper and lower molds has a cavity to which mold resin is poured in. The cavity is filled with mold resin. Thus, capacitor elements 2 welded to lead frame 30, the portion to be the anode lead frame and the portion to be the cathode lead frame are sealed by mold resin portion 40, as shown in FIG. 14.

Figure 15:
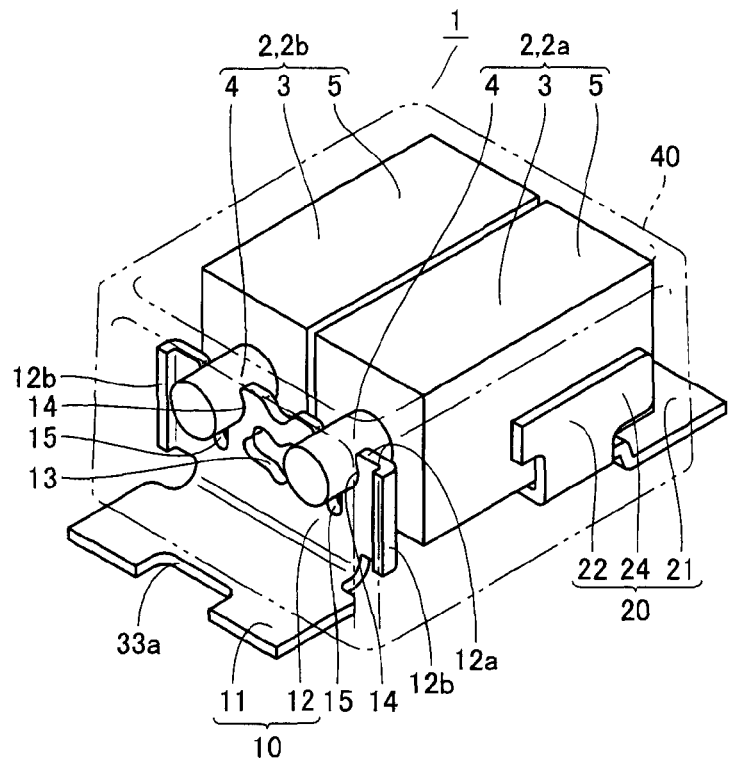
FIG. 15 is a perspective view showing a step following the step of FIG. 14, in accordance with the embodiment.

Next, mold resin portion 40 sealing capacitor elements 2 is cut out from lead frame 30. Here, lead frame 30 is cut at a prescribed position (see dotted line), where a part of open side wall surface 33a of fillet hole 33 formed in the portion to be the anode lead frame is left. Similarly, lead frame 30 is cut at a prescribed position (see FIG. 6 etc.), where a part of open side wall surface of fillet hole 34 formed in the portion to be the cathode lead frame is left. The plating on the left portions such as open side wall surface 33a serves to guide solder, when the solid electrolytic capacitor is mounted on a printed circuit board or the like. In this manner, the solid electrolytic capacitor 1 having capacitor elements 2 and the like sealed with mold resin portion 40 is completed, as shown in FIG. 15.

In the solid electrolytic capacitor 1 described above, anode portion 4 of capacitor element 2 is welded to rising portion 12 formed integral with anode terminal portion 11, by the bending process of lead frame 30. Therefore, as compared with the conventional solid electrolytic capacitor having a pillow member interposed between the lead frame and the anode portion, such additional pillow member becomes unnecessary, and the process of welding the pillow member to the lead frame becomes unnecessary, so that manufacturing cost can be reduced.

Figure 16:
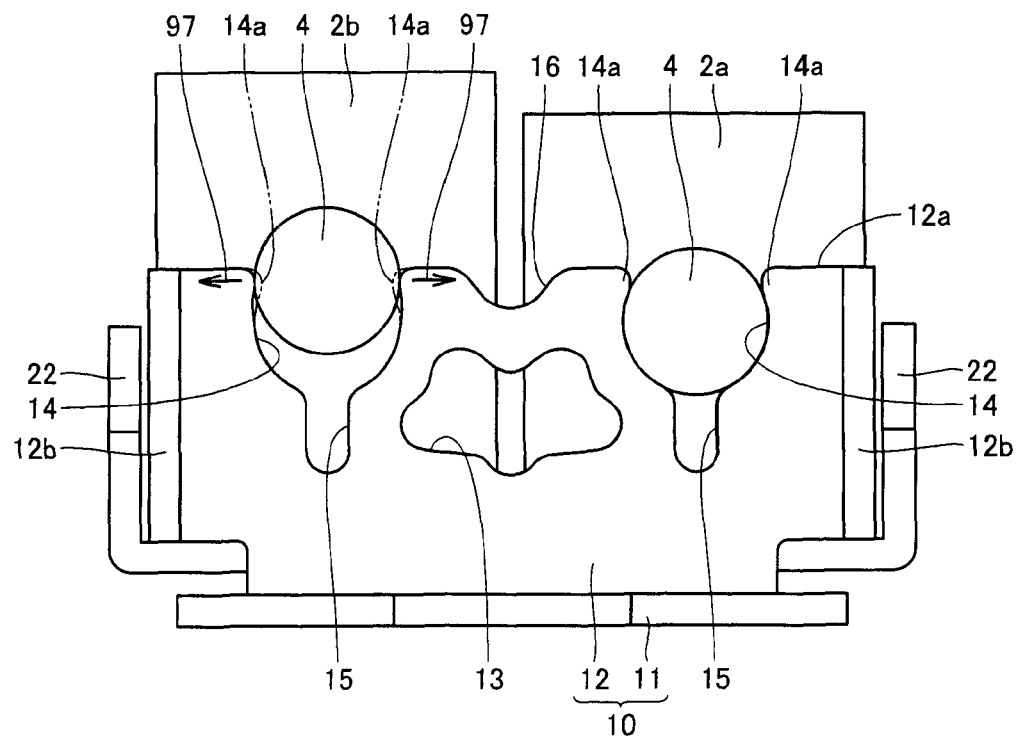
FIG. 16 is a first front view illustrating function and effect of the rising portion, in accordance with the embodiment.

Further, as shown in FIG. 16, at rising portion 12, catching recesses 14, holding portions 14a and first slit 15 are formed. In the welding process, starting from the state in which anode portion 4 is in contact with holding portion 14a, the anode portion 4 is pressed from above, whereby the space between holding portions 14a, 14a is widened, the anode portion 4 passes through the widened space, and received in catching recess 14. At this time, as the first slit 15 is formed at a lower portion of catching recess 14, distortion (stress) generated at the rising portion when the space between holding portions 14a, 14a is widened can be released by the first slit 15. Further, the first slit 15 provides resiliency of catching recess 14 and holding portion 14a, and once anode portion 4 is received in catching recess 14, the space between holding portions 14a and 14a that has been widened returns to the original space, whereby anode portion 4 can be held with high accuracy at the prescribed position.

Further, at a portion between one and the other catching recesses 14 of rising portion 12, a second slit 16 is formed that extends downward from the upper end, and below the second slit 16, a through hole 13 is formed. Therefore, as indicated by an arrow 97, the distortion generated at rising portion 12 when the space between holding portions 14a and 14a is widened can more effectively be alleviated. Consequently, deformation of rising portion 12 can be prevented, and attachment of capacitor element 2 on lead frame 30 deviated from a prescribed position because of deformation of rising portion 12 can also be prevented. As a result, it becomes possible to connect (weld) capacitor element 2 at a prescribed position of lead frame 30 reliably with high accuracy.

Figure 17:
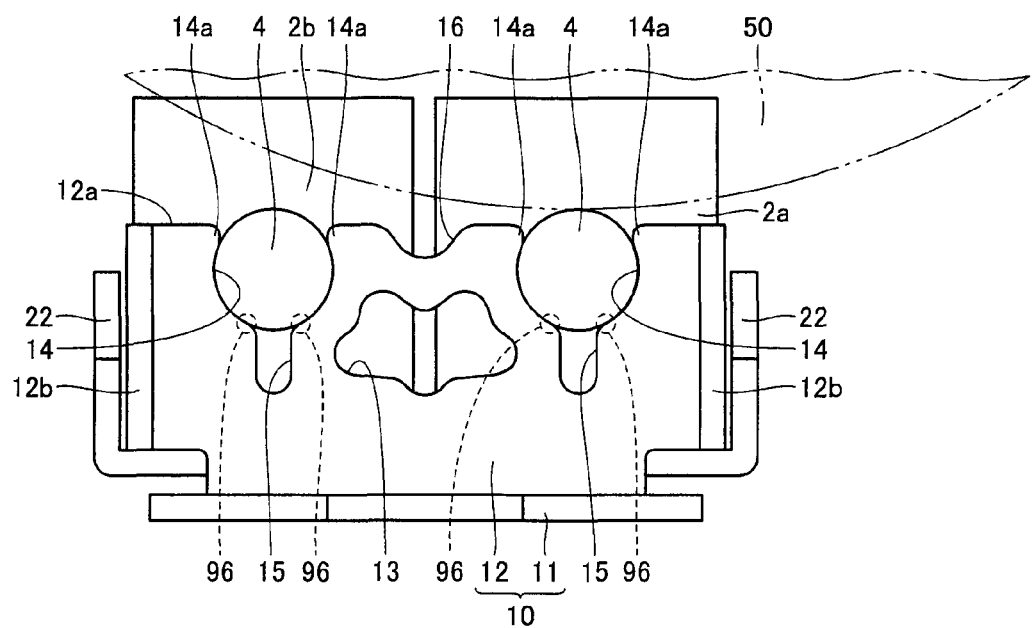
FIG. 17 is a second front view illustrating function and effect of the rising portion, in accordance with the embodiment.

Further, as shown in FIG. 17, at the time of welding, at two points (dotted circles 96) on the opposite sides of first slit 15 among portions where catching recess 14 and anode portion 4 are in contact with each other, substantial welding between anode portion 4 and catching recess 14 takes place. On the other hand, if the catching recess does not have the first slit, welding between the anode portion and the catching recess takes place at one point at the lower end of catching recess. Specifically, welded portions between anode portion 4 and catching recess 14 increases, and hence, capacitor element 2 can more firmly be attached to lead frame 30.

When capacitor element 2 and the like are sealed with mold resin 40, it follows that mold resin 40 flows through the first slit 15 and through hole 13. This makes easier the escape of gas contained in mold resin 40 to the outside, and therefore, filling property of mold resin 40 can be improved. Further, as the first slit 15 and the through hole 13 are filled with mold resin 40, the first slit 15 and the through hole 13 come to serve as anchors to mold resin portion 40. As a result, closer contact between mold resin portion 40 and rising portion 112 and the like can be attained. Further, by the first slit 15 and through hole 13, the heat at the time of welding can effectively be radiated.

Figure 18:
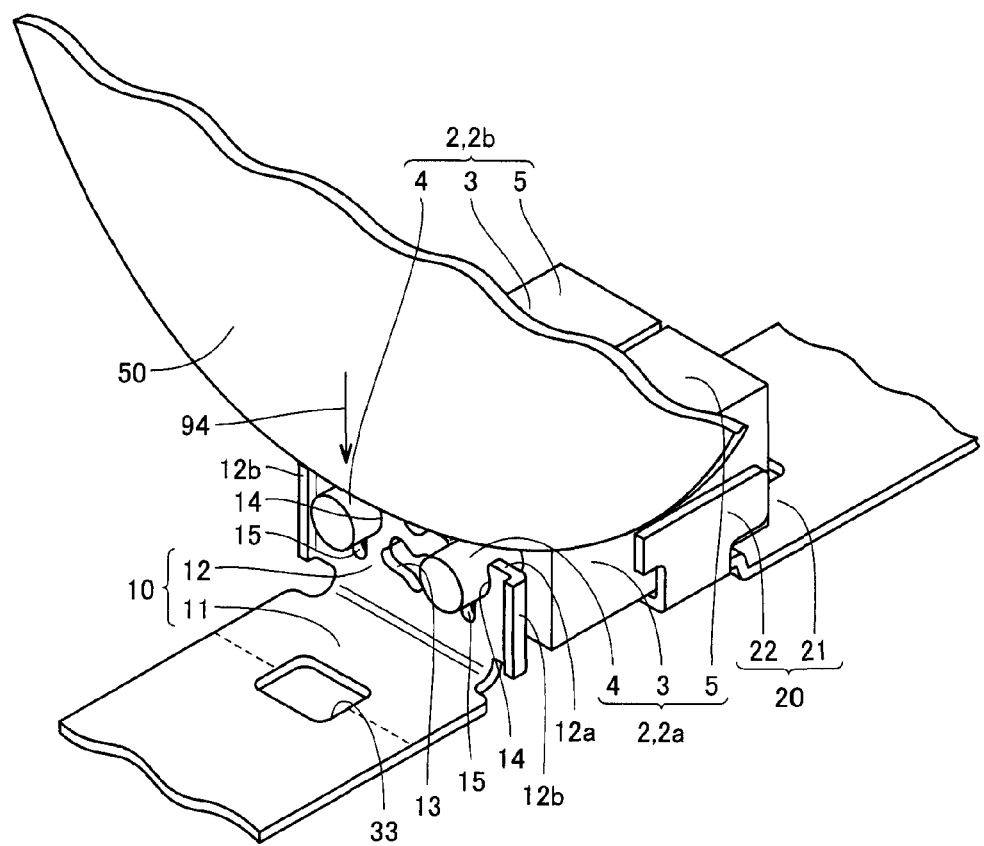
FIG. 18 is a partial perspective view illustrating function and effect of the rising portion, in accordance with the embodiment.

Further, at rising portion 12, side end portions 12b are bent in a direction away from cathode portion 5 of capacitor element 2. This reliably prevents deformation or fall of rising portion 12 because of pressing force, by the pressing force when anode portion 4 is pressed from above to be received by catching recess 14 of rising portion 12 (see FIG. 16) or by the pressing force at the time of welding (arrow 94) as shown in FIG. 18. Further, as the side end portions 12b are bent, adhesion with mold resin portion 40 can be improved.

Figure 19:
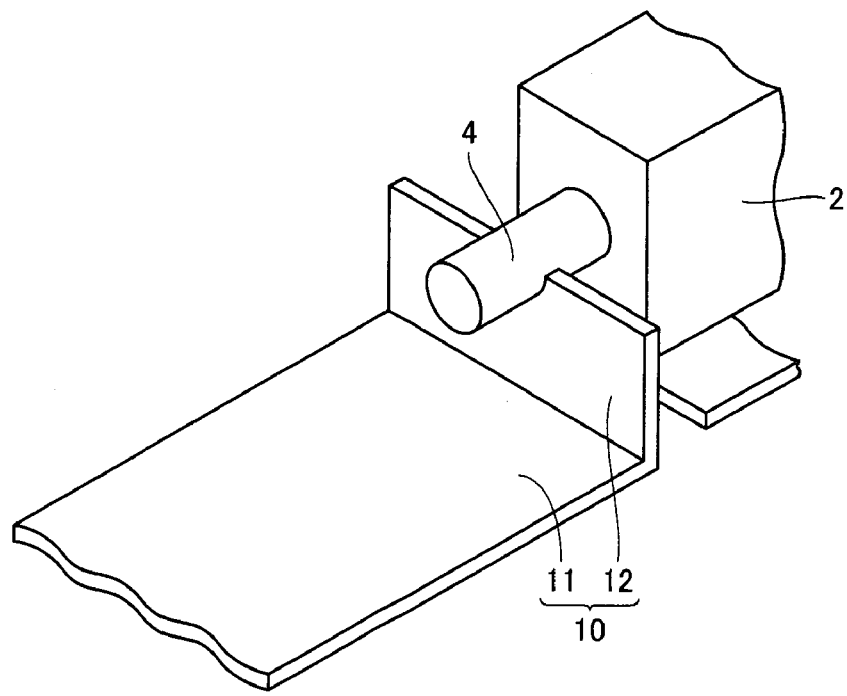
FIG. 19 is a partial perspective view schematically showing the rising portion, illustrating the function and effect of the rising portion, in accordance with the embodiment.
Figure 20:
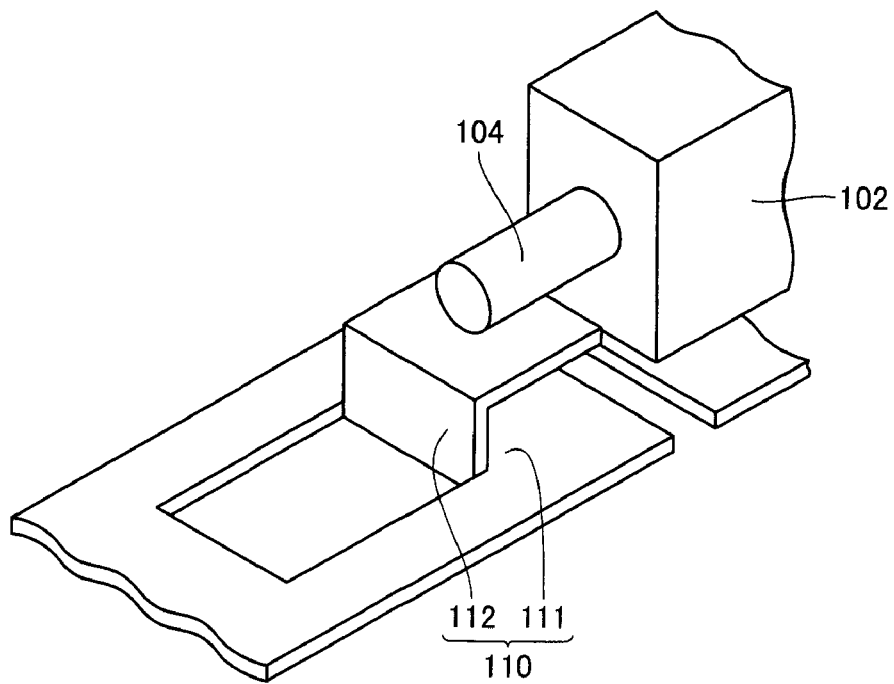
FIG. 20 is a partial perspective view schematically showing the rising portion of a comparative example.
Figure 21:
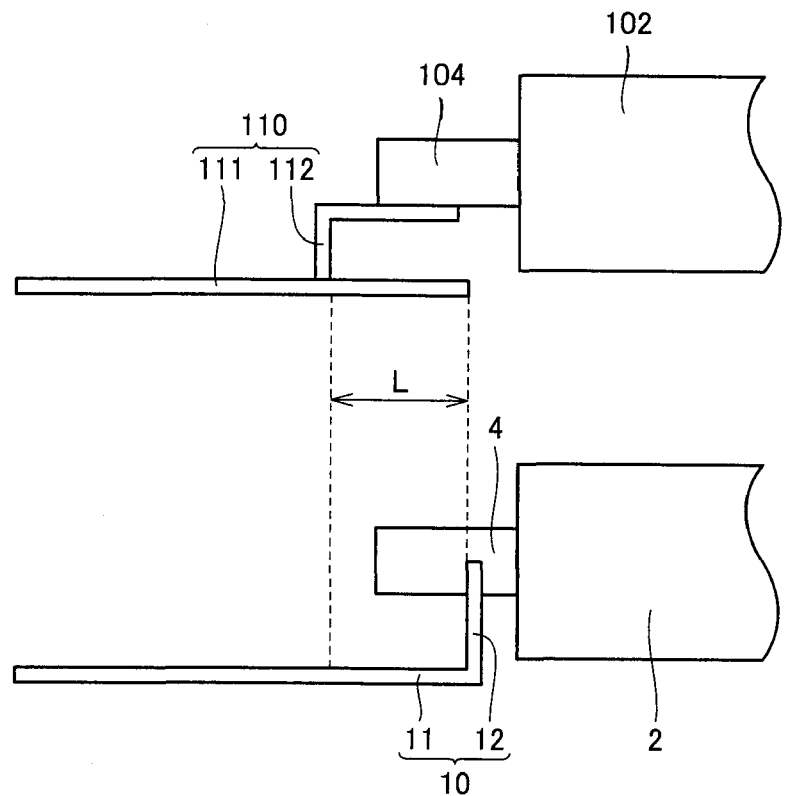
FIG. 21 is a partial side view illustrating function and effect of the rising portion, in accordance with the embodiment.

Further, as shown in FIG. 19, rising portion 12 is formed to extend from an end closer to the cathode portion 5 of capacitor element 2 of anode terminal portion 11 to the anode portion 4 of capacitor element 2. Therefore, as compared with a comparative example shown in FIG. 20 in which a rising portion 112 is formed by cutting and raising part of an anode terminal portion 111 to be in contact with an anode portion 104, the position where rising portion 12 is raised from anode terminal portion 11 can be made closer by a distance L to the capacitor element 2. As a result, resistance between anode portion 4 and anode terminal 11 can be reduced. Further, capacitor element can be made larger by the distance L and, hence, volumetric efficiency can be improved.

Further, as shown, for example, in FIG. 1, cathode lead frame 20 of solid electrolytic capacitor 1 has a pair of side surface portions 22 opposite to each other. Therefore, when capacitor element 2 is mounted on lead frame 30, what is necessary is simply to place capacitor element 2 in an area between one side surface portion 22 and the other side surface portion 22. Thus, positioning of capacitor element 2 with respect to lead frame 30 becomes easier.

Further, side surface portion 22 has extended portion 24, so that contact area between the cathode portion 5 of capacitor element 2 and cathode lead frame 20 can be increased. This leads to reduction of equivalent series resistance (ESR) as the resistance component of capacitor element 2.

Figure 22:
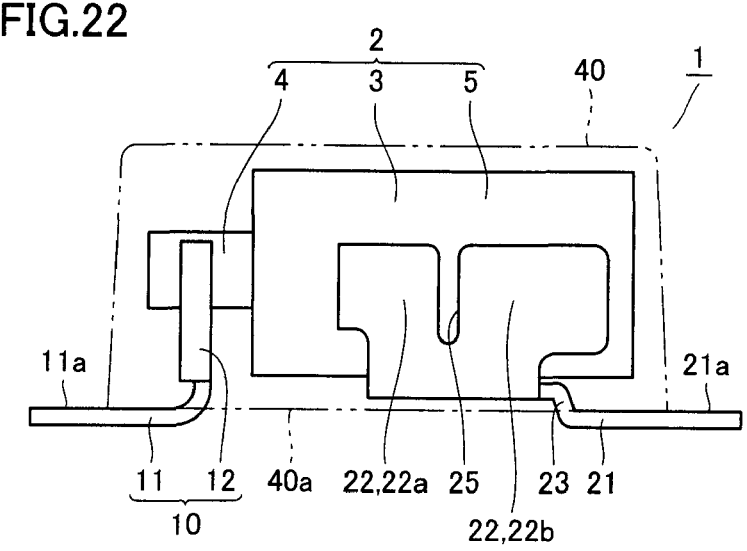
FIG. 22 is a side view showing a modification of a side surface portion of the cathode lead frame in accordance with the embodiment.
Figure 23:
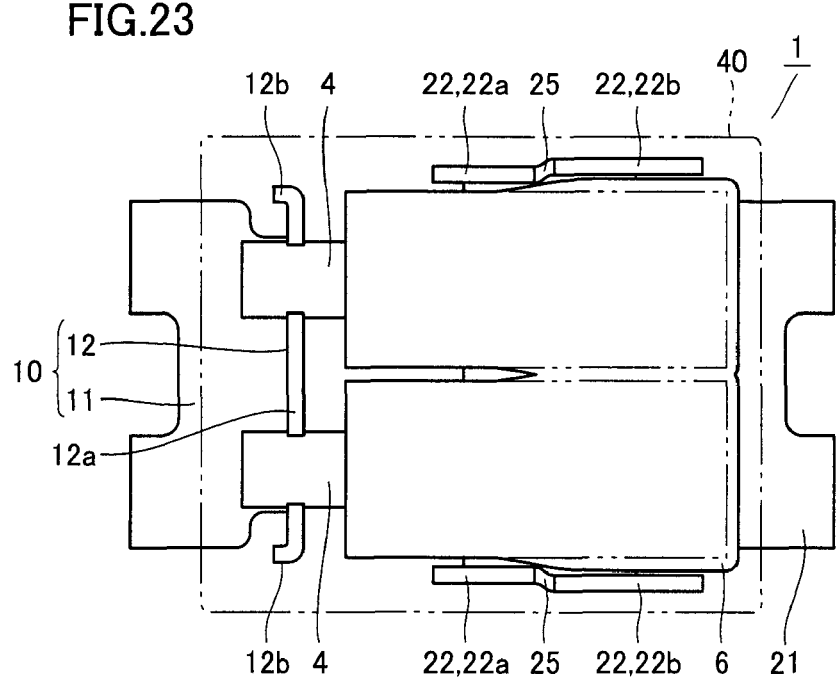
FIG. 23 is a top view showing the solid electrolytic capacitor shown in FIG. 22 in accordance with the embodiment.

Further, as shown in FIG. 22, side surface portion 22 may be divided into side surface portions 22a and 22b by forming a slit 25. This ensures contact of side surface portion 22 to cathode portion 5. Cathode portion 5 is dipped in silver paste and lifted and, therefore it is coated with silver paste. As a result, sometimes a pool 6 of silver paste forms on cathode portion 5. At this time, as shown in FIG. 23, when side surface portion 22 is divided into side surface portions 22a and 22b, it becomes possible to bring side surface portion 22b into contact with a portion with silver paste pool 6 and to bring side surface portion 22a into contact with a portion without silver paste pool 6. Therefore, as compared with the side surface portion without any slit, contact area is ensured between side surface portion 22 and cathode portion 5.

Further, in solid electrolytic capacitor 1 described above, bottom surface 40a of mold resin portion 40 is in direct contact with upper surface 11a of anode terminal portion 11 and upper surface 21a of cathode terminal portion 21. Specifically, bottom surface 40a and upper surfaces 11a and 21a are positioned substantially on the same plane. Therefore, it becomes possible to ensure larger capacity of the cavity, by placing an end portion of metal mold cavity closer to the fillet hole. This will be described with respect to a solid electrolytic capacitor of a comparative example.

Figure 24:
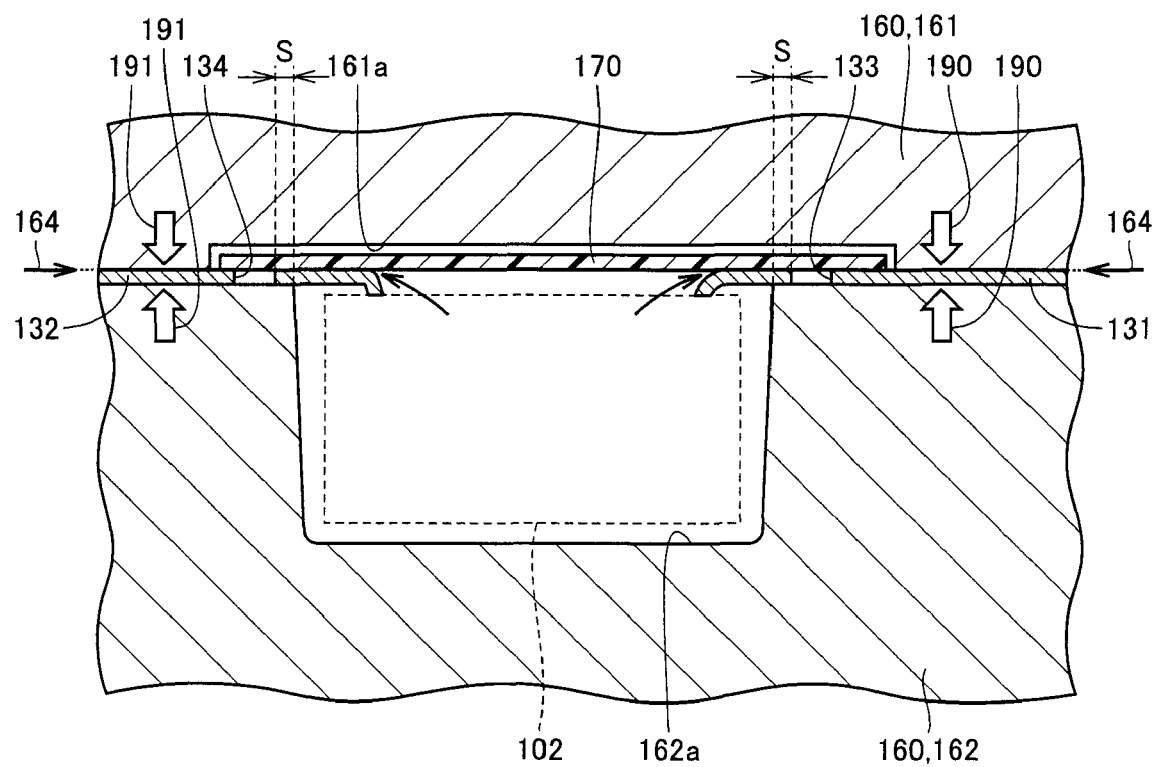
FIG. 24 is a partial sectional view showing the step of sealing the solid electrolytic capacitor with mold resin, in accordance with a comparative example.

First, in the solid electrolytic capacitor in accordance with the comparative example, the bottom surface of mold resin portion is formed to be at an approximately the same position as the lower surface of anode terminal portion and the lower surface of cathode terminal portion. As shown in FIG. 24, at the step of filling mold resin, in order to prevent mold resin from leaking to the surfaces of the portion 131 to be the anode lead frame and the portion 132 to be the cathode lead frame, an insulating tape 170 formed, for example, of polyimide is adhered to the surface of the lead frame. Further, the insulating film is adhered to close fillet holes 133 and 134 formed in lead frame 130. To prevent mold resin from flowing between insulating tape 170 and lead frame 130 and further leaking to fillet holes 133 and 134 because of mold resin introducing pressure, an end portion of a cavity 162a is separated by a prescribed distance S from fillet holes 133 and 134.

An upper metal mold 161 has a recess 161a formed in consideration of the thickness of insulating tape 170. Fastening forces (arrows 190, 191) are applied to the upper and lower metal molds 161 and 162 at portions other than where the insulating tape 170 is adhered, and mold resin is poured into cavity 162a formed in lower metal mold 162, so that capacitor element and the like are sealed. It is noted that an arrow 164 indicates a position of splitting surface (joint surface) of upper and lower metal molds 161 and 162.

Figure 25:
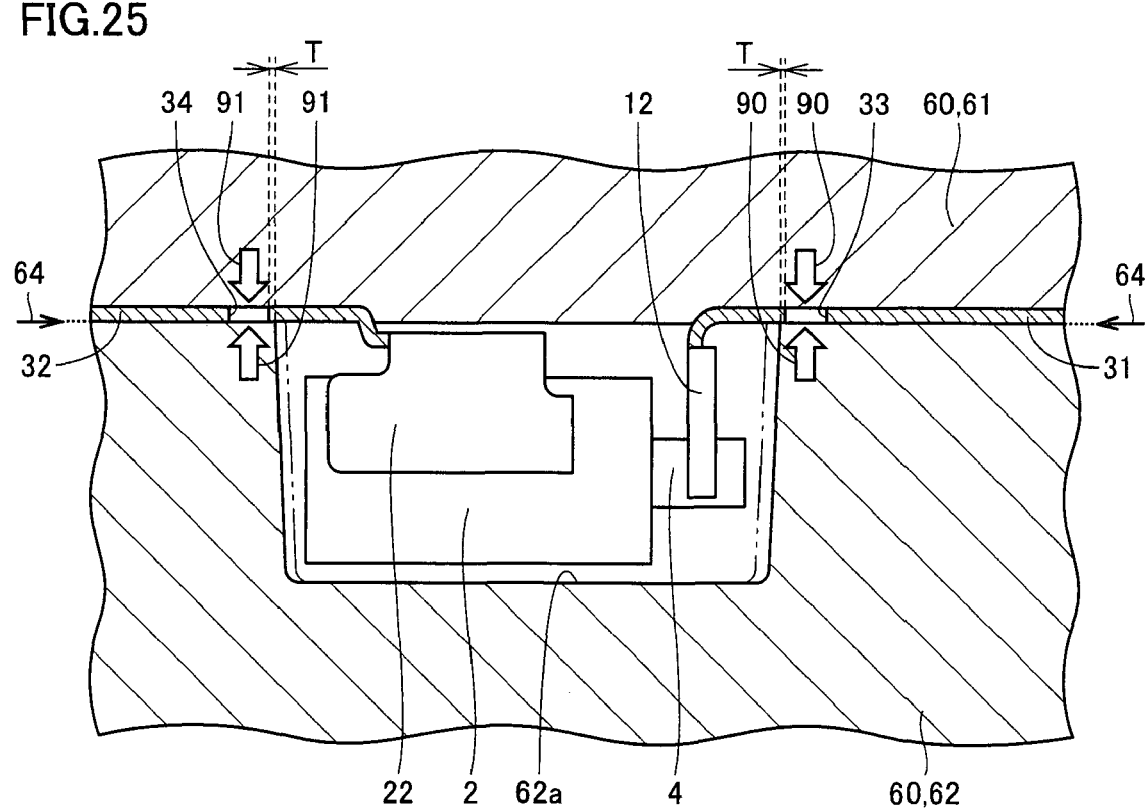
FIG. 25 is a partial sectional view showing the step of sealing the solid electrolytic capacitor with mold resin, in accordance with the embodiment.

In contrast, in solid electrolytic capacitor described above, the bottom surface of mold resin portion is formed to be substantially at the same position as the upper surface of anode terminal portion and the upper surface of cathode terminal portion. As shown in FIG. 25, at the step of filling mold resin, it is unnecessary to adhere an insulating tape to the lead frame. Therefore, it is possible to apply the fastening forces (arrows 90, 91) to upper metal mold 61 and lower metal mold 62 at positions very close to cavity 62a. Specifically, the distance between the end portion of cavity 62a and fillet holes 33, 34 can be made shorter from S to T. Further, the distance of protrusion of lead frame (anode terminal portion 11, cathode terminal portion 12) from mold resin portion 40 becomes shorter and, therefore, possible defects caused by being caught, for example, during packing or shipment can be reduced. It is noted that an arrow 64 indicates a position of splitting surface (joint surface) of upper and lower metal molds 61 and 62.

In this manner, in the solid electrolytic capacitor described above, upper metal mold 61 and lower metal mold 62 can be fastened at close vicinity of cavity 62a and, therefore, cavity 62a can be placed very close to fillet holes 33 and 34. Therefore, with fillet holes 33 and 34 being at the same position, larger capacity of the cavity can be ensured and, therefore, a larger capacitor element can be mounted as the capacitor element to be sealed in mold resin portion 40. Further, the distance of protrusion of anode terminal portion 11 and cathode terminal portion 12 from mold resin portion 40 becomes shorter and, therefore, possible defects caused by being caught, for example, during packing or shipment can be reduced. It is noted that two-dotted lines represent the ends of lower mold cavity of the comparative example.

Further, the lead frame is pinched between the upper and lower metal molds 61 and 62 with the upper metal mold being in direct contact with the (rear surface of) lead frame and, therefore, flowing of mold resin to the rear surfaces of anode terminal portion 11 and cathode terminal portion 12 can reliably be prevented.

Modification of Anode Lead Frame

Figure 26:
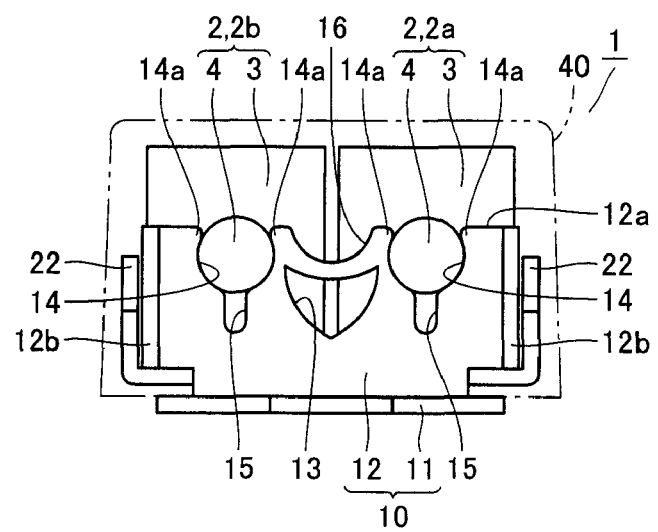
FIG. 26 is a front view showing a solid electrolytic capacitor to which a first modification of the anode lead frame is applied, in accordance with the embodiment.
Figure 27:
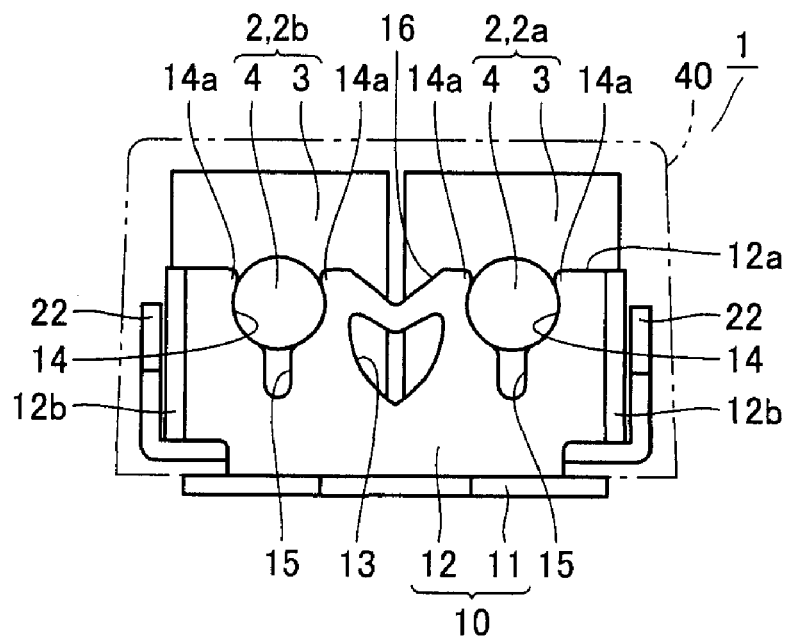
FIG. 27 is a front view showing a solid electrolytic capacitor to which a second modification of the anode lead frame is applied, in accordance with the embodiment.
Figure 28:
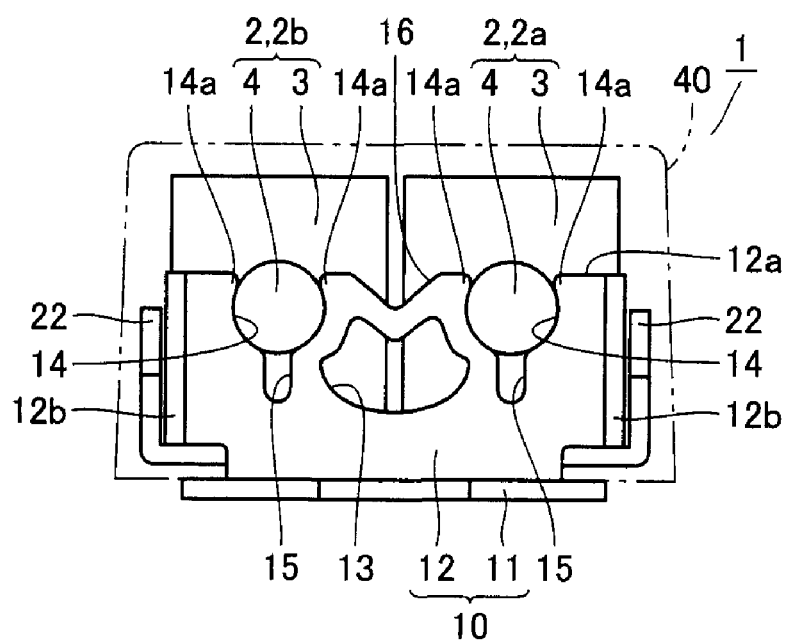
FIG. 28 is a front view showing a solid electrolytic capacitor to which a third modification of the anode lead frame is applied, in accordance with the embodiment.
Figure 29:
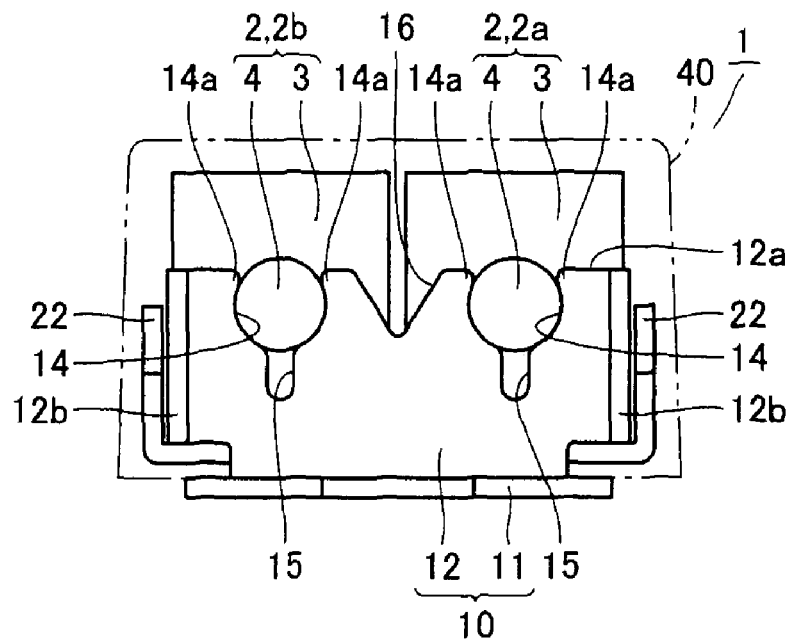
FIG. 29 is a front view showing a solid electrolytic capacitor to which a fourth modification of the anode lead frame is applied, in accordance with the embodiment.
Figure 30:
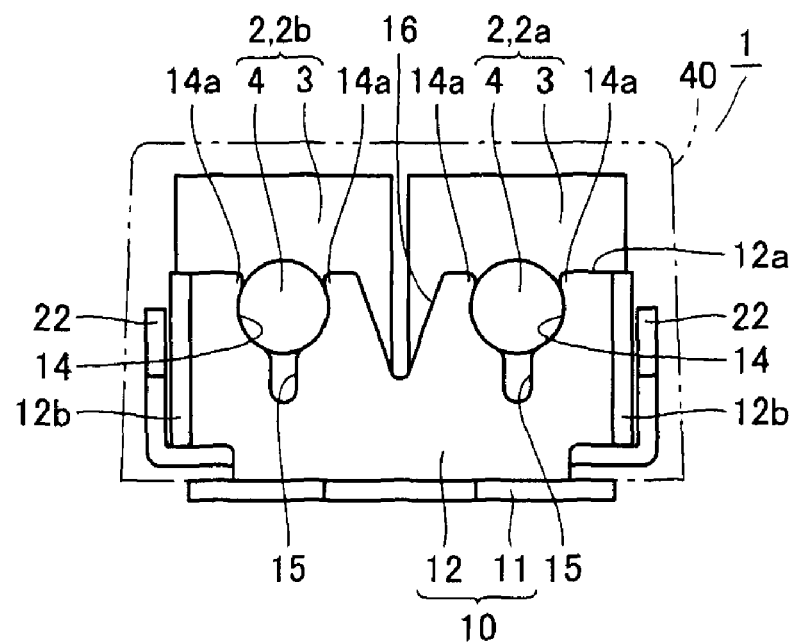
FIG. 30 is a front view showing a solid electrolytic capacitor to which a fifth modification of the anode lead frame is applied, in accordance with the embodiment.

As the second slit 16 and through hole 13 formed at rising portion 12 of solid electrolytic capacitor 1, other than the second slit 16 and through hole 13 shown in FIG. 2 and the like, the second slit 16 may be a semi-circular recess and through hole 13 may have a shape corresponding to that of second slit 16, as shown in FIG. 26. Alternatively, the second slit 16 may have an approximately V-shape and through hole 13 may have a shape corresponding to that of second slit 16, as shown in FIG. 27 or 28. In place of forming a through hole below the second slit 16, a deeper, approximately V-shaped second slit 16 may be formed, as shown in FIG. 29 or 30.

Figure 31:
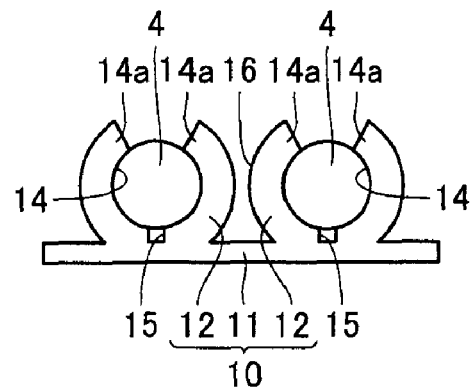
FIG. 31 is a front view showing a solid electrolytic capacitor to which a sixth modification of the anode lead frame is applied, in accordance with the embodiment.
Figure 32:
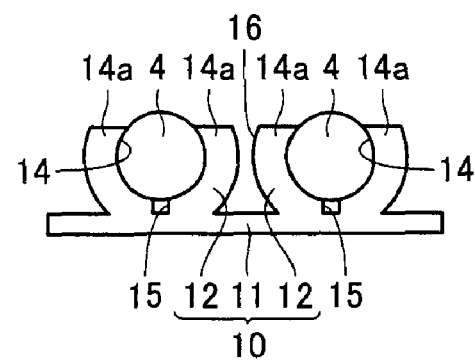
FIG. 32 is a front view showing a solid electrolytic capacitor to which a seventh modification of the anode lead frame is applied, in accordance with the embodiment.
Figure 33:
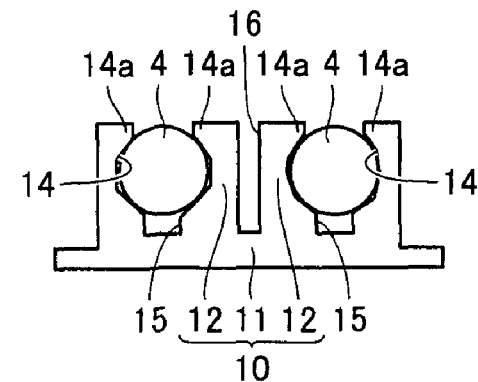
FIG. 33 is a front view showing a solid electrolytic capacitor to which an eighth modification of the anode lead frame is applied, in accordance with the embodiment.
Figure 34:
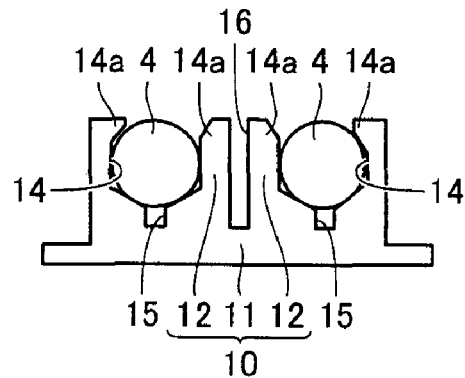
FIG. 34 is a front view showing a solid electrolytic capacitor to which a ninth modification of the anode lead frame is applied, in accordance with the embodiment.
Figure 35:
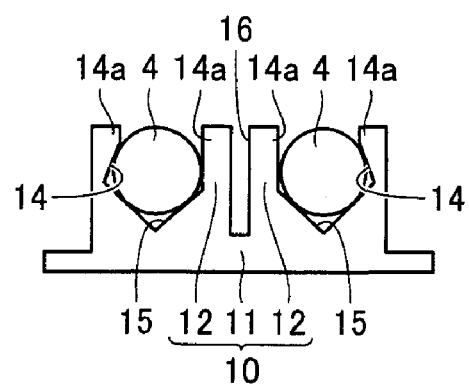
FIG. 35 is a front view showing a solid electrolytic capacitor to which a tenth modification of the anode lead frame is applied, in accordance with the embodiment.
Figure 36:
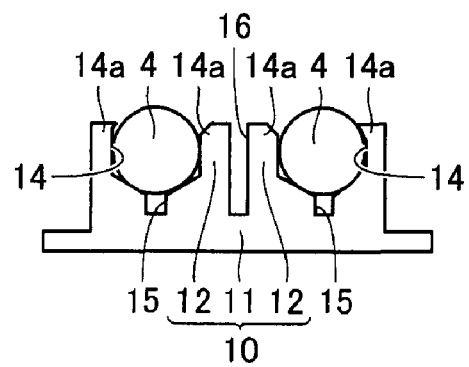
FIG. 36 is a front view showing a solid electrolytic capacitor to which an eleventh modification of the anode lead frame is applied, in accordance with the embodiment.
Figure 37:
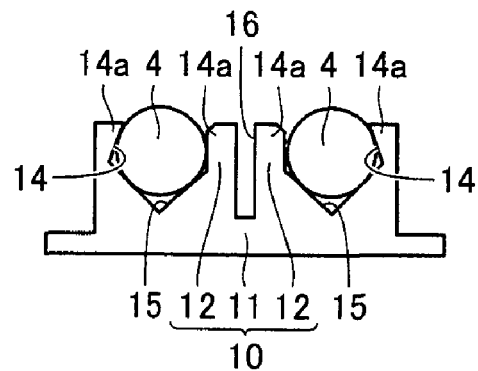
FIG. 37 is a front view showing a solid electrolytic capacitor to which a twelfth modification of the anode lead frame is applied, in accordance with the embodiment.
Figure 38:
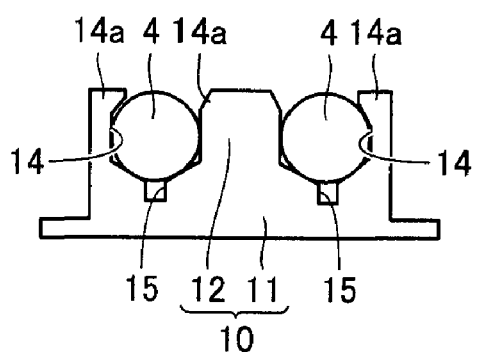
FIG. 38 is a front view showing a solid electrolytic capacitor to which a thirteenth modification of the anode lead frame is applied, in accordance with the embodiment.
Figure 39:
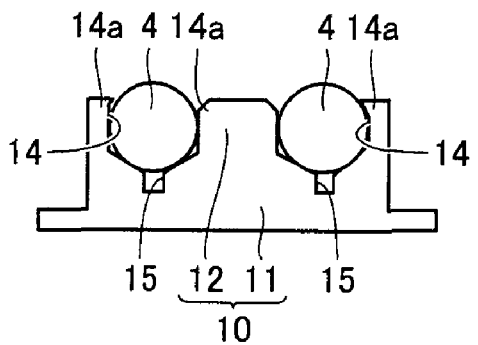
FIG. 39 is a front view showing a solid electrolytic capacitor to which a fourteenth modification of the anode lead frame is applied, in accordance with the embodiment.
Figure 40:
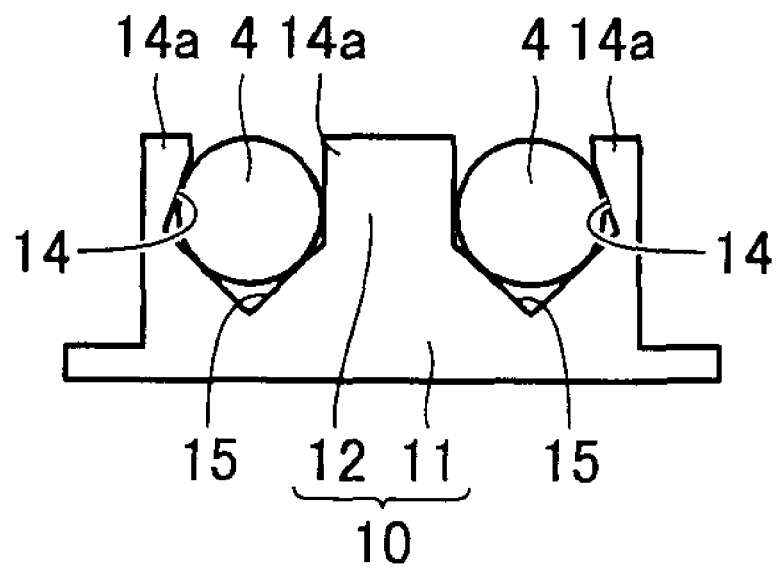
FIG. 40 is a front view showing a solid electrolytic capacitor to which a fifteenth modification of the anode lead frame is applied, in accordance with the embodiment.
Figure 41:
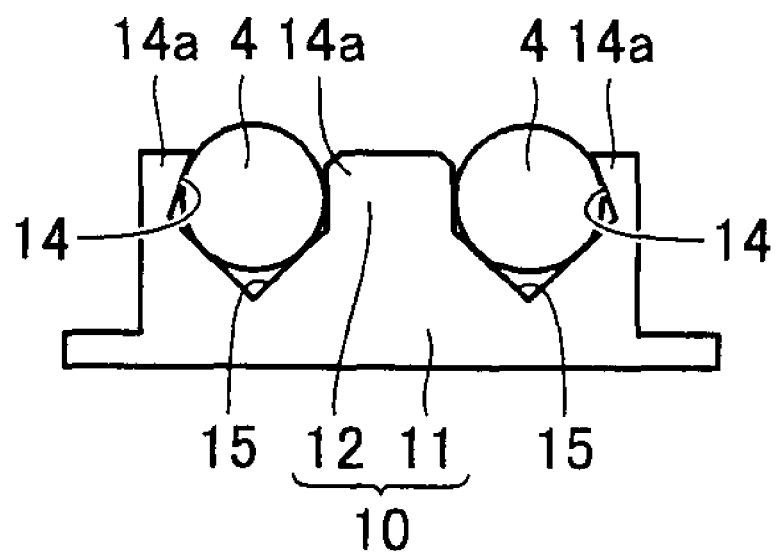
FIG. 41 is a front view showing a solid electrolytic capacitor to which a sixteenth modification of the anode lead frame is applied, in accordance with the embodiment.

Further, the anode lead frame may be an anode lead frame 10 having catching recesses corresponding to the circumferential surface of anode portion 5 as shown in FIG. 31 or 32. Alternatively, anode lead frame 10 may have rectangular second slit 16 as shown in FIG. 33, 34, 35, 36 or 37. Further, an anode lead frame not having the second slit such as shown in FIG. 38, 39, 40 or 41 may be adopted, provided that the stress at the rising portion can be released toward the side end portions.

Variation of Number of Capacitor Elements

Figure 42:
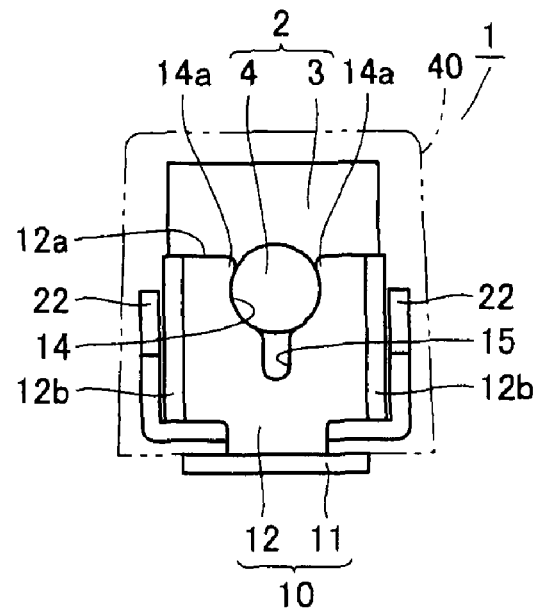
FIG. 42 is a front view showing the solid electrolytic capacitor when one capacitor element is mounted.
Figure 43:
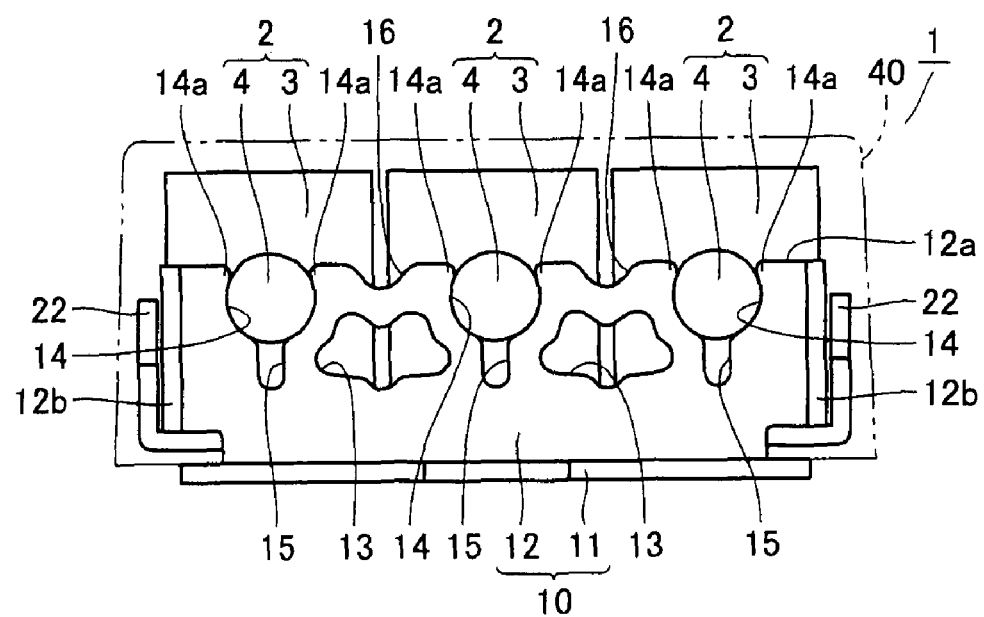
FIG. 43 is a front view showing the solid electrolytic capacitor when three capacitor elements are mounted.
Figure 44:
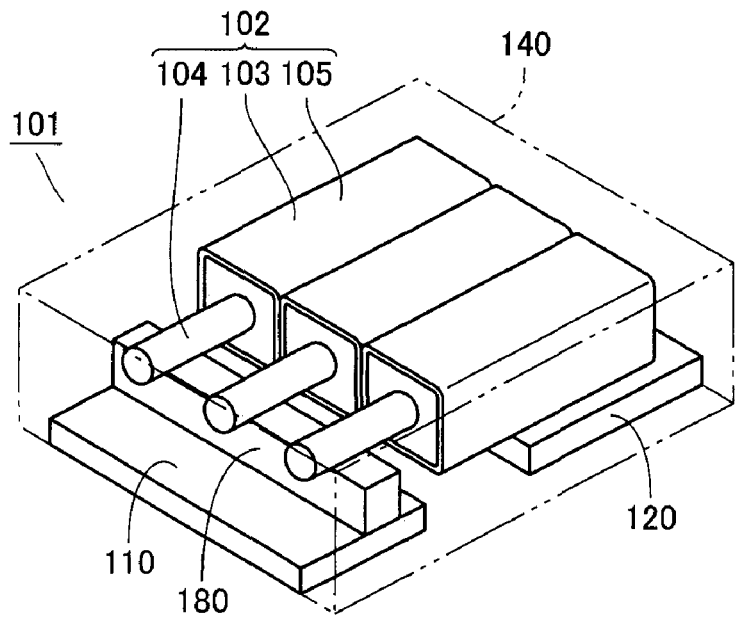
FIG. 44 is a perspective view showing a conventional solid electrolytic capacitor.
Figure 45:
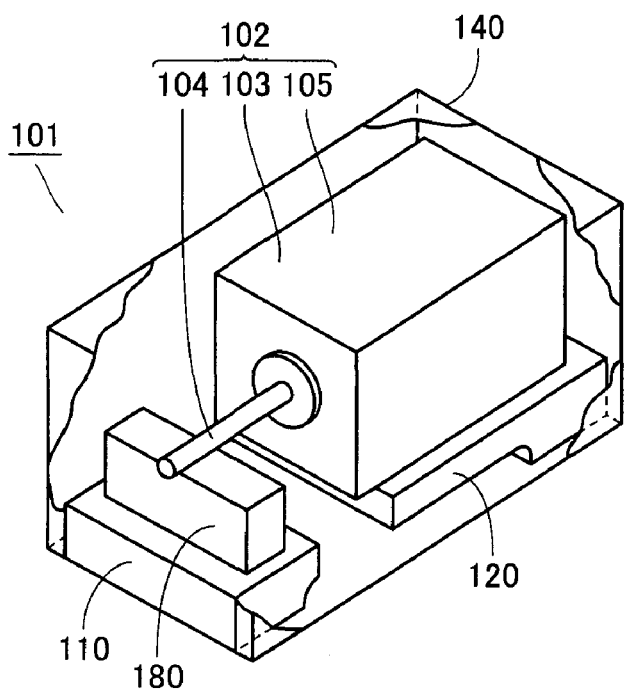
FIG. 45 is a perspective view showing another conventional electrolytic capacitor.

In the foregoing, solid electrolytic capacitor 1 having two capacitor elements 2 has been described as an example of solid electrolytic capacitor 1 (see FIG. 1 etc.). The number of capacitor elements 2 is not limited to two, and solid electrolytic capacitor 1 may have one capacitor element 2 mounted thereon as shown in FIG. 42. Further, solid electrolytic capacitor 1 may have three capacitor elements 2 mounted thereon, as shown in FIG. 43. Further, the solid electrolytic capacitor may have four or more capacitor elements mounted thereon (not shown). In FIGS. 42 and 43, the same components as those of solid electrolytic capacitor 1 shown in FIG. 2 are denoted by the same reference characters.

In a solid electrolytic capacitor capable of mounting two or more capacitors, the number of mounted capacitor elements may be smaller than the maximum mountable number. In that case, the capacitor elements may be arranged at arbitrary positions in the region between the pair of opposing side surface portions of the cathode lead frame. Then, the catching recess, the first slit and the like may be formed at prescribed regions of the rising portion corresponding to the positions of capacitor elements. The position of forming the through hole can easily be changed simply by changing the punching block of a punching metal mold, and it is unnecessary to prepare a new metal mold.

In the method of manufacturing the solid electrolytic capacitor, by way of example, the anode portion of capacitor element is connected to the rising portion by welding (resistance welding) using a welding electrode. Other than this method, the anode portion may be connected to the rising portion by laser welding. Further, the anode portion may be connected to the rising portion using a conductive paste. Further, by combining these methods, wielding by welding electrode may be performed first, and a gap between the anode portion and the rising portion, for example, may be filled with conductive paste. This approach attains firmer connection between the anode portion and the rising portion, and increases contact area between the anode portion and the rising portion. Thus, ESR can be reduced.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A solid electrolytic capacitor, comprising:
   a capacitor element having an anode portion and a cathode portion;
   a mold resin portion sealing said capacitor element;
   an anode lead frame connected to said anode portion from below said anode portion of said capacitor element, inside said mold resin portion; and
   a cathode lead frame connected to said cathode portion;
   said anode lead frame including
   a catching recess having an opening facing upward, for receiving said anode portion,
   holding portions formed at said opening of said catching recess, said holding portions being spaced apart by a prescribed distance that prevents passage of said anode portion except when said anode portion is pressed from above causing the distance between the holding portions to widen and allow passage of said anode portion, and holds said anode portion once said anode portion is received in said catching recess, and
   a slit extending downward from said catching recess.

2. The solid electrolytic capacitor according to claim 1, wherein
   said anode lead frame includes
   an anode terminal portion exposed along a bottom surface of said mold resin portion, and
   a rising portion formed integral with said anode terminal portion, extending from an end of said anode terminal portion closer to said cathode portion of said capacitor element through said mold resin portion toward said anode portion of said capacitor element, and is connected to said anode portion; and
   said catching recess, said holding portion and said slit are formed in said rising portion.

3. The solid electrolytic capacitor according to claim 2, wherein
   said rising portion includes one and the other side end portions positioned in a direction orthogonal to the direction of said rising portion extending from said anode terminal portion, and each of said side end portions is bent in a direction away from said cathode portion of said capacitor element.

4. The solid electrolytic capacitor according to claim 2, wherein
said anode lead frame is arranged such that an upper surface of said anode terminal portion is in direct contact with a bottom surface of said mold resin portion.

5. The solid electrolytic capacitor according to claim 1, wherein
said cathode lead frame includes
a cathode terminal portion exposed along a bottom surface of said mold resin portion, and
a pair of side surface portions extending from said cathode terminal portion through a step portion and inside said mold resin portion, erected opposite to each other with said cathode portion of said capacitor element placed therebetween and connected to said cathode portion.

6. The solid electrolytic capacitor according to claim 5, wherein
said side surface portion includes
a first side surface portion, and
a second side surface portion positioned on an opposite side to said anode portion with respect to said first side surface portion.

7. The solid electrolytic capacitor according to claim 5, comprising
an extending portion extending from said side surface portion to a side opposite to said anode portion.

8. The solid electrolytic capacitor according to claim 5, wherein
said cathode lead frame is arranged such that an upper surface of said cathode terminal portion is in direct contact with the bottom surface of said mold resin portion.

9. The solid electrolytic capacitor according to claim 1, comprising:
a plurality of said capacitor elements; wherein
said anode portion of each of said plurality of capacitor elements is arranged in the same direction and connected to said anode lead frame.

10. The solid electrolytic capacitor according to claim 9, wherein
a through hole is formed at a region immediately below a portion between one and the other capacitor elements adjacent to each other, among said plurality of capacitor elements.

11. The solid electrolytic capacitor according to claim 9, wherein
at a portion of said anode lead frame immediately below a portion between one and the other capacitor elements adjacent to each other among said plurality of capacitor elements, another slit is formed extending downward from an upper end of said anode lead frame.

12. A solid electrolytic capacitor, comprising:
a capacitor element having an anode portion and a cathode portion;
a mold resin portion sealing said capacitor element;
an anode lead frame connected to said anode portion from below said anode portion of said capacitor element, inside said mold resin portion; and
a cathode lead frame connected to said cathode portion;
said anode lead frame including
a catching recess opened upward, for receiving said anode portion,
a holding portion formed, on said opened side of said catching recess, to prevent passage of said anode portion, allowing passage of said anode portion when said anode portion is pressed from above, and holding said anode portion once said anode portion is received in said catching recess,
a slit extending downward from said catching recess,
an anode terminal portion exposed along a bottom surface of said mold resin portion, and
a rising portion formed integral with said anode terminal portion, extending from an end of said anode terminal portion closer to said cathode portion of said capacitor element through said mold resin portion toward said anode portion of said capacitor element, and is connected to said anode portion; and
said catching recess, said holding portion and said slit are formed in said rising portion, and,
wherein said rising portion includes
one and the other side end portions positioned in a direction orthogonal to the direction of said rising portion extending from said anode terminal portion, and
each of said side end portions is bent in a direction away from said cathode portion of said capacitor element.

13. A solid electrolytic capacitor, comprising:
a capacitor element having an anode portion and a cathode portion;
a mold resin portion sealing said capacitor element;
an anode lead frame connected to said anode portion from below said anode portion of said capacitor element, inside said mold resin portion; and
a cathode lead frame connected to said cathode portion;
said anode lead frame including
a catching recess opened upward, for receiving said anode portion,
a holding portion formed, on said opened side of said catching recess, to prevent passage of said anode portion, allowing passage of said anode portion when said anode portion is pressed from above, and holding said anode portion once said anode portion is received in said catching recess,
a slit extending downward from said catching recess,
wherein the solid electrolytic capacitor comprises a plurality of said capacitor elements,
wherein said anode portion of each of said plurality of capacitor elements is arranged in the same direction and connected to said anode lead frame, and
wherein at a portion of said anode lead frame immediately below a portion between one and the other capacitor elements adjacent to each other among said plurality of capacitor elements, another slit is formed extending downward from an upper end of said anode lead frame.

* * * * *